US007126726B2

(12) United States Patent
Takei et al.

(10) Patent No.: US 7,126,726 B2
(45) Date of Patent: Oct. 24, 2006

(54) IMAGE READING APPARATUS

(75) Inventors: Akira Takei, Yamanashi-ken (JP); Makoto Shimizu, Yamanashi-ken (JP); Mitsuhiro Ishihara, Yamanashi-ken (JP); Tetsuya Aiyama, Yamanashi-ken (JP); Masaki Oshima, Yamanashi-ken (JP)

(73) Assignee: Nisca Corporation, Yamanashi-Ken (JP)

(*) Notice: Subject to any disclaimer, the term of this patent is extended or adjusted under 35 U.S.C. 154(b) by 890 days.

(21) Appl. No.: 10/151,724

(22) Filed: May 21, 2002

(65) Prior Publication Data

US 2002/0176121 A1 Nov. 28, 2002

(30) Foreign Application Priority Data

May 25, 2001 (JP) ............................ 2001-157955
May 25, 2001 (JP) ............................ 2001-157956
May 25, 2001 (JP) ............................ 2001-157958
May 25, 2001 (JP) ............................ 2001-157976
May 25, 2001 (JP) ............................ 2001-157977
Aug. 31, 2001 (JP) ............................ 2001-265003

(51) Int. Cl.
*H04N 1/04* (2006.01)
*H04N 1/46* (2006.01)

(52) U.S. Cl. ...................... 358/474; 358/497; 358/496; 358/494

(58) Field of Classification Search ................ 358/474, 358/497, 496, 494, 487, 506
See application file for complete search history.

(56) References Cited

U.S. PATENT DOCUMENTS 6,233,064 B1 * 5/2001 Griffin ........................ 358/474
6,661,539 B1 * 12/2003 Nee ........................... 358/474

FOREIGN PATENT DOCUMENTS

| | | |
|---|---|---|
| JP | 63-88955 | 4/1988 |
| JP | 9-270896 | 10/1997 |
| JP | 10-276330 | 10/1998 |
| JP | 2000-196834 | 7/2000 |
| JP | 2000-278480 | 10/2000 |
| JP | 2001-22138 | 1/2001 |

OTHER PUBLICATIONS

Patent Abstract of Japan, No. 09046483, publication date Feb. 14, 1997, Applicant Canon Inc.

* cited by examiner

*Primary Examiner*—Jerome Grant, II
*Assistant Examiner*—Houshang Safaipour
(74) *Attorney, Agent, or Firm*—Manabu Kanesaka

(57) ABSTRACT

An image reading apparatus includes a platen, a frame for holding the platen, an installation device disposed to the frame so that the platen can be held in a substantially vertical state, and a scanning device for reading a document along the platen substantially vertically held. The reading of the document is carried out by elevating or lowering the scanning device.

18 Claims, 27 Drawing Sheets

IMAGE READING APPARATUS

BACKGROUND OF THE INVENTION AND RELATED ART STATEMENT

This invention relates to an image reading apparatus for reading an image on a document, such as a photograph, more particularly, to an image reading apparatus for reading an image on a stationary document placed on a contact glass while a scanning device is moving.

There have been two types of image reading apparatuses for reading an image on a document commercially available in a market.

One of them is generally called as a flatbed type scanner, which has a contact glass for placing a document thereon. A scanning device including photoelectric conversion elements, such as CCD, and an optical system, i.e. a light source or the like, moves to read an image on a stationary document on the contact glass.

The other is generally called as a document-type scanner, wherein the scanning device of the flatbed type scanner is fixed, and the document is moved with respect to the scanning device so that the image thereon is read.

However, in the flatbed type scanner, the contact glass needs a large area enough to place the document, and is placed horizontally with respect to an installation place so that the document is placed thereon. Therefore, since the installation space of the apparatus becomes large, it has not been possible to meet a recent requirement to reduce the installation space.

Also, while the document-type scanner has an advantage of a small installation space compared to the flatbed type scanner, since the image on the moving document is read, there has been a problem such that the image data is affected by vibrations generated from the document movement, thus a high quality image can not be obtained.

In view of the above problems, the present invention has been made, and an object of the invention is to provide an image reading apparatus, wherein the installation space of the apparatus can be small, and high quality image data can be obtained.

Further objects and advantages of the invention will be apparent from the following description of the invention.

SUMMARY OF THE INVENTION

In order to achieve the above objects, according to the first aspect of the invention, an image reading apparatus includes a contact glass or platen; a frame for holding the contact glass; an installation device disposed to the frame so that the contact glass is held substantially vertically; and a scanning device for reading an image of a stationary document along the vertically held contact glass so that the image of the document can be read by elevating or lowering the scanning device.

In the present invention having the structure as described above, since the installation device is provided to the frame by which the contact glass is held, the contact glass can be held substantially vertically, so that the installation area of the apparatus can be reduced. Further, since the image of the stationary document on the contact glass is read by moving the scanning device, high quality image data can be obtained. Furthermore, the scanning device moving vertically along the contact glass reads the image, so that the installation area of the apparatus can be further reduced.

According to the second aspect of the invention, an image reading apparatus of the invention includes a contact glass held substantially vertically and a scanning device vertically movable along the contact glass for reading an image of a document. The scanning device reads the image of the document held along the contact glass at a predetermined reading position while the device is moving upward.

The present invention having the structure as described above can reduce the installation area of the apparatus as in the first aspect and, at the same time, high quality image data can be obtained. Further, since the reading is carried out while the scanning device is moving upward, vibrations generated by the moving scanning device can be reduced, so that better image data can be obtained.

Also, according to the third aspect of the invention, an image reading apparatus includes a contact glass held substantially vertically and a scanning device movable along the contact glass for reading an image of a document. When the document is stopped at a predetermined reading position where the reading is carried out by the scanning device, a stop reference position as a standard is located in the vicinity of the lower end of the contact glass. Accordingly, the document stopped at the stop reference position along the contact glass is read while the scanning device is moving.

The invention structured as described above, as in the first aspect of the invention, can reduce the installation area of the apparatus and, at the same time, high quality image data can be obtained. Further, since the stop reference position for stopping the document is set in the vicinity of the lower end of the contact glass, a length of the contact glass in the height direction can be shortened to thereby reduce a size of the apparatus. Also, since the stop device for stopping the document at the stop reference position is provided, even if the document falls down during moving, the document abuts against the stop device so that the document can be set at the reading position.

According to the fourth aspect of the invention, an image reading apparatus includes a contact glass held substantially vertically; a scanning device held on one surface side of the contact glass and reading a document held along the contact glass while moving; and a document transfer unit disposed on the other surface side of the contact glass for transferring the document to a predetermined reading position where the reading is carried out by the scanning device. The document transfer unit includes a document supply tray on which the documents are placed, a transfer device disposed along the contact glass to transfer the document from the document supply tray to a predetermined reading position, and a document discharge tray for receiving thereon the document discharged from the reading position by the transfer device. One of the document supply tray and the document discharge tray is located at an upper portion of the transfer device to be substantially perpendicular to the contact glass, and the other is located at a lower portion of the transfer device to be substantially perpendicular to the contact glass.

In the image reading apparatus of the invention structured as described above, in the same manner as in the first aspect of the invention, the installation area of the apparatus can be reduced and, at the same time, high quality image data can be obtained. Further, the document transfer unit for transferring the document to the predetermined reading position is disposed on one side of the contact glass, and the document supply tray and the document discharge tray are disposed on the upper and lower portions of the document transfer unit. Thus, the document can be supplied to or taken out from one side of the apparatus. Further, since the document supply tray and the document discharge tray are disposed perpendicular to the contact glass, respectively, even if the apparatus is installed at an elevated place, the documents on the respective trays is visible.

Also, according to the fifth aspect of the invention, an image reading apparatus of the invention includes a contact glass disposed substantially perpendicular to an installation surface of a supporting frame; an exposure device movable along the contact glass; a reading element for reading reflected light from the exposure device; a document insertion port for inserting the document to the contact glass; the second reading area set on the contact glass for reading the image of the document while stopping the exposure device and moving the document; and the first reading area for reading the image of the document while stopping the document transferred along the contact glass and moving the exposure device. The document insertion port, the second reading area and the first reading area are located in this order from the upper portion to the lower portion along the contact glass. Therefore, even if the document has a relatively high friction coefficient, an image reading with the optimum picture quality or picture quality desired by an operator can be carried out.

DETAILED DESCRIPTION OF THE PREFERRED EMBODIMENTS

First Embodiment

Hereunder, with reference to the accompanying drawings, an embodiment in which the present invention is applied to an image reading apparatus for reading an image on a photograph will be explained. Incidentally, the image reading apparatus of the invention is installed in a system, for example, shown in FIG. 1. Using such a system, a photo processing shop can provide a service that the system reads an image on a photograph brought into by a customer or developed in the photo processing shop, and the image read by the apparatus is processed, compiled and stored in a storage media, such as a CD-ROM. The service also includes delivering the image by an electrical mail through the Internet. The system is connected to its host computer PC.

Figure 2:
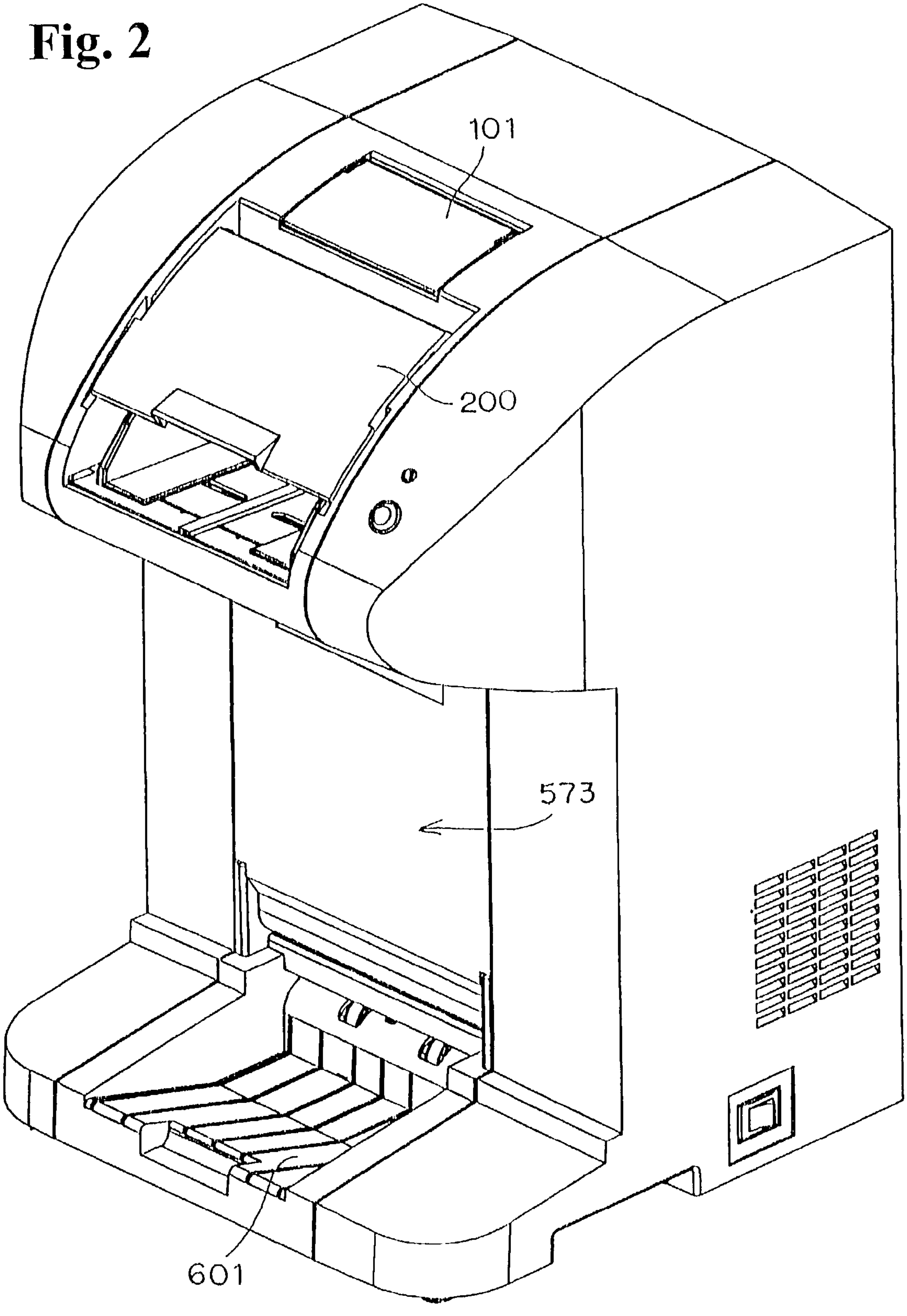
FIG. 2 is a perspective view of an image reading apparatus according to an embodiment of the invention.
Figure 3:
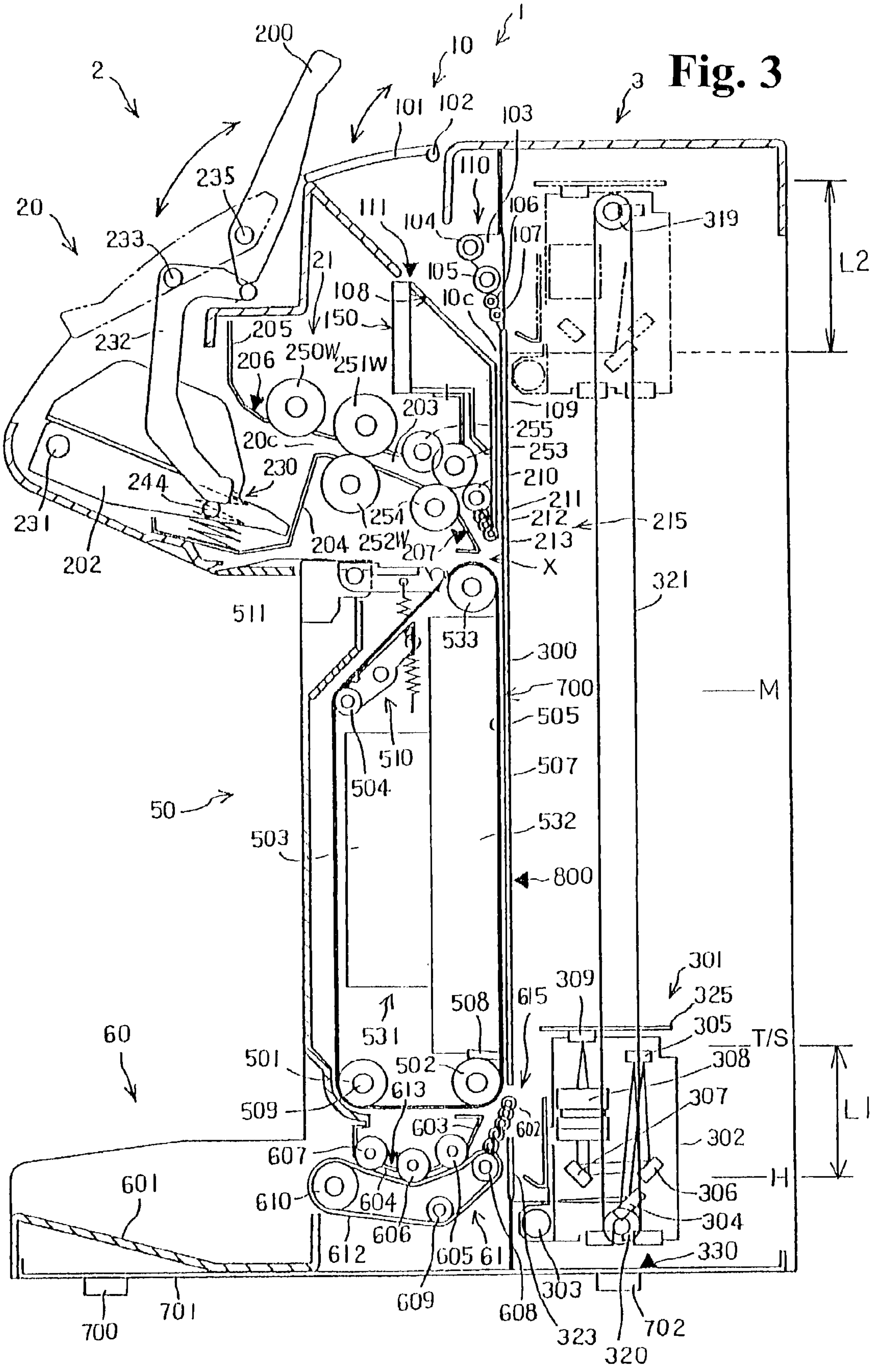
FIG. 3 is a side sectional view showing the image reading apparatus according to the embodiment of the invention in FIG. 2.

An image reading apparatus 1 of the embodiment as shown in FIG. 2 includes an image reading unit 3 for reading the image on the photograph as an original, and a transfer unit 2 for transferring the photograph to a predetermined reading position 800 where the image reading unit 3 reads the image, as shown in FIG. 3.

As shown in FIG. 3, the image reading unit 3 includes a contact glass or platen 300 formed of a transparent glass disposed substantially vertically; a white reference plate 323 positioned at a lower portion of the contact glass 300 for correcting shading; a carriage 301 (scanning device) for reading the image on the photograph while moving along the contact glass 300 over a distance corresponding to a length of the photograph; a driving system 310 for moving the carriage 301 vertically along the contact glass 300; and a home position sensor 330 for detecting the carriage 301.

Figure 4:
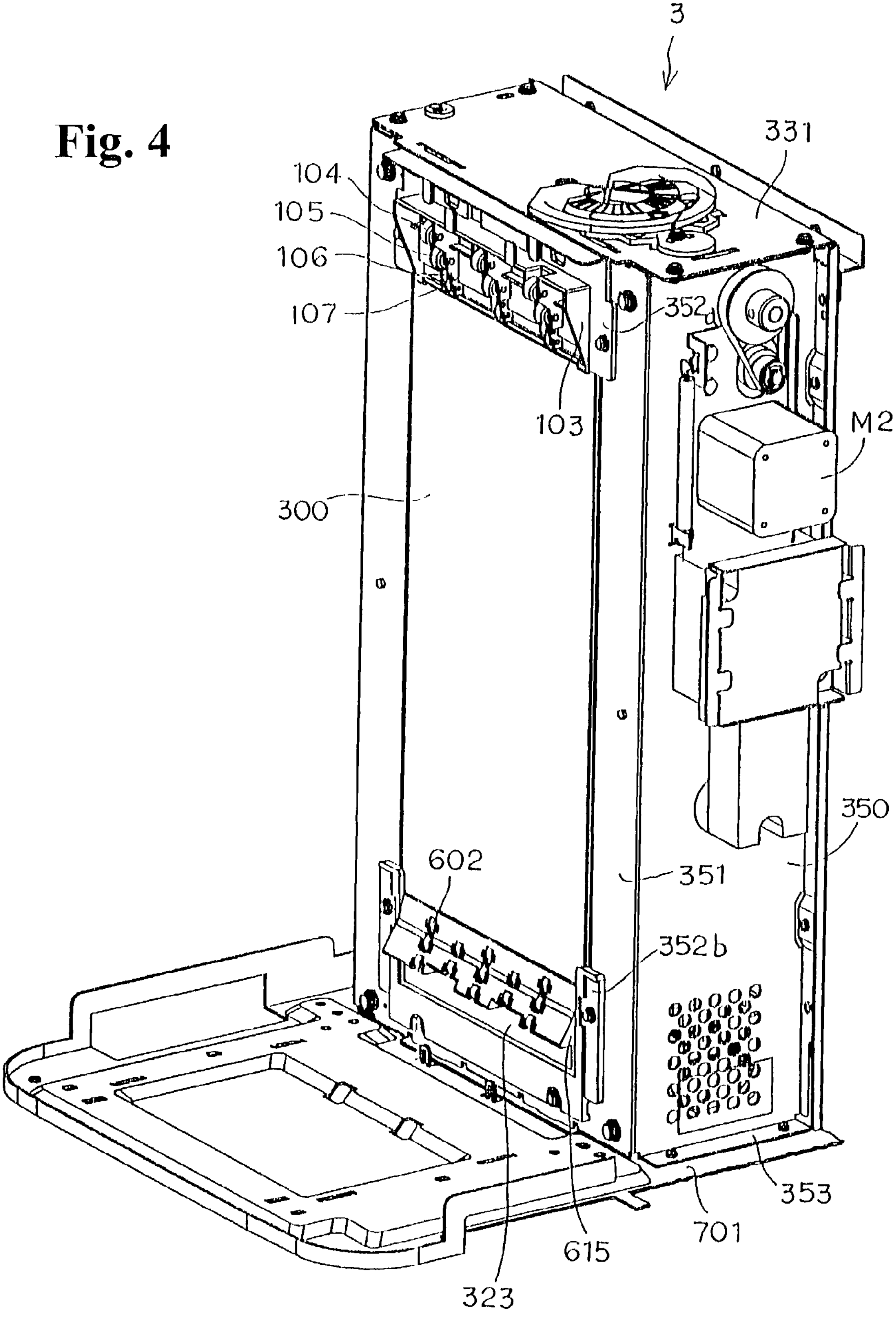
FIG. 4 is a perspective view showing a state in which a contact glass of an image reading unit is installed according to the embodiment of the invention in FIG. 2.

As shown in FIG. 4, the contact glass 300 is attached to a metal frame 350. The frame 350 includes an attaching surface 351 having a rectangular opening slightly smaller than the contact glass 300, and has a substantially U-shape section. The contact glass 300 is placed onto the opening of the attaching surface 351; the upper end thereof is sandwiched between a resin attaching member 352*a* and the attaching surface 351; the lower end thereof is sandwiched between a resin attaching member 352*b* and the attaching surface 351; and the respective upper and lower ends of the contact glass 300 are fixed to the attaching surface 351 of the frame 350 by screws from sides of the respective attaching members 352*a* and 352*b*. Rectangular supporting surfaces 353 extending in a direction perpendicular to the attaching surface 351 are formed at a lower end portion on both sides of the frame 350. The supporting surfaces 353 are fixed to a lower frame 701 constituting a bottom surface of the image reading apparatus 1 by screws from a lower surface side of the lower frame 701. The white reference plate 323 is attached to the lowest end of the opening of the attaching surface 351, in the same manner as the contact glass 300, by being sandwiched between the attaching member 352*b* and the attaching surface 351. Incidentally, on the installation surface side (a back side) of the lower frame 701, four resin legs 702 (installation device) for contacting an installation surface are fixed to the lower frame 701 with a predetermined space therebetween (shown in FIG. 3). Therefore, the contact glass 300 is fixed to the lower frame 701 to be substantially vertical, and further the contact glass 300 is substantially vertically supported with respect to the installation surface of the image reading apparatus 1 through an attachment of the resin legs 702 to the lower frame 701.

Also, a guide member 103 with a substantially triangular cross section is integrally formed with the attaching member 352*a*. Rollers 104, 105, 106, and 107, each consisting of three rollers, are horizontally disposed in a row with a space therebetween, and are attached to the guide member 103. Also, in the same manner, a rotor supporting portion 615 with a substantially R-shape cross section is integrally formed with the attaching member 352*b*. A plurality of rollers (rotors) 602 constituting a part of a curved discharge path 604 in an discharge portion 60, described later, is disposed in a zigzag pattern wherein outer peripheries of adjacent rollers overlap each other in a transfer (discharge) direction of the photograph.

Also, the contact glass 300 is flush with the white reference plate 323 in a vertical direction through the rotor supporting member 615.

Figure 5:
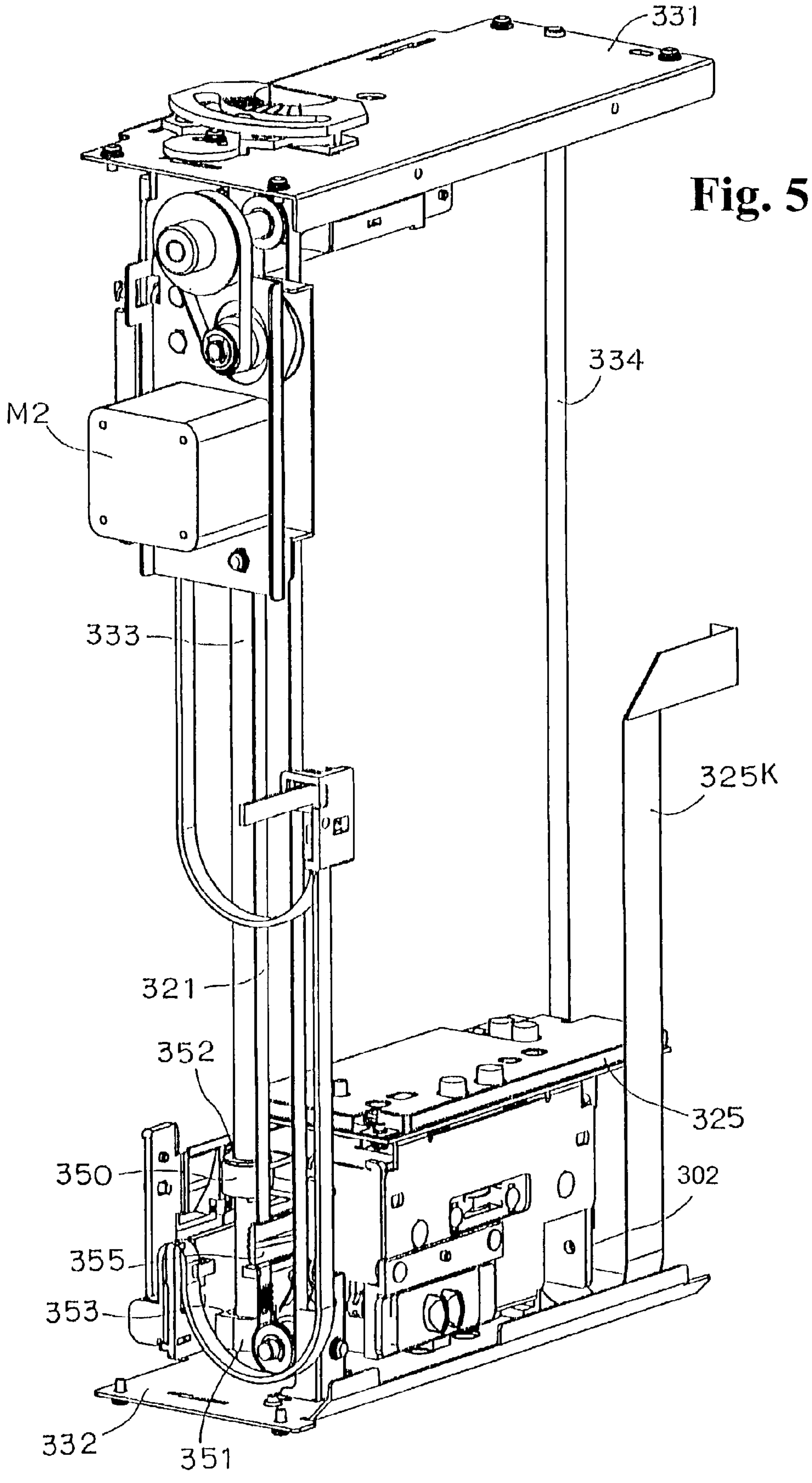
FIG. 5 is a perspective view showing a moving structure of a carriage of the embodiment of the invention in FIG. 2.
Figure 16:
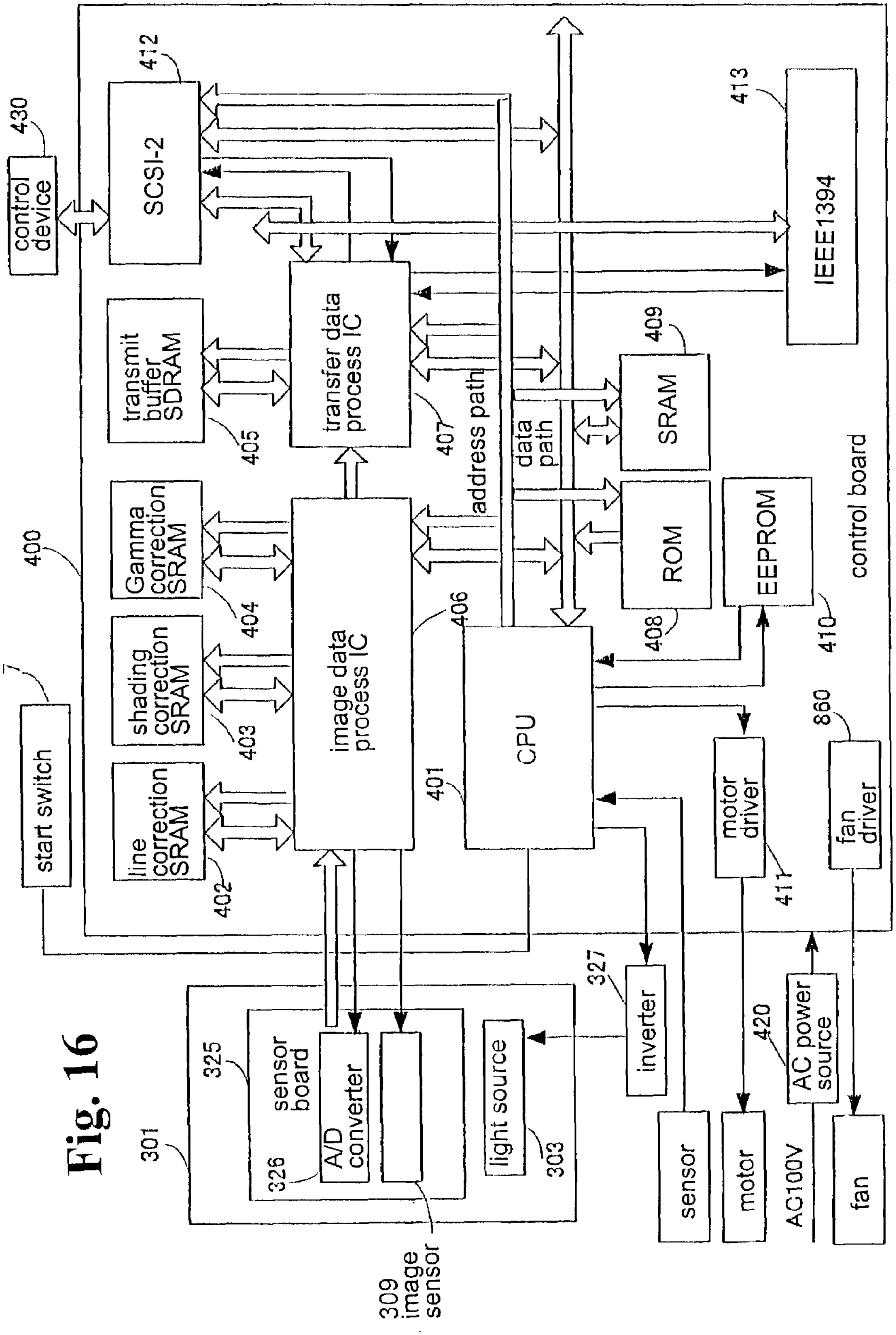
FIG. 16 is a block diagram showing a control portion.

As shown in FIGS. 3 and 5, the carriage 301 includes a carriage frame 302 made of a resin. Insides the carriage frame 302, there are housed and fixed thereto a bar-like light source 303, such as a Xenon lamp, for irradiating light to the photograph; a plurality of mirrors 304, 305, 306 and 307 for changing a light path of the reflected light from the photograph; and a lens unit 308 for allowing the reflected light from the mirror 307 to form an image. Further, a sensor board 325 is attached to an outside of the carriage frame 302. To the sensor board 325, there are attached a color image sensor 309 consisting of three CCDs for conducting photoelectric conversion of the reflected light of an image formed through the lens unit 308 by three RGB colors; an A/D converter for converting analog data from the color image sensor 309 to digital data; and a signal cable 325K (shown in FIG. 5) for transferring the image data and the like from the A/D converter to a control board 400, described later. Also, an inverter 327 turns on the light source 303 as shown in FIG. 16.

Figure 6:
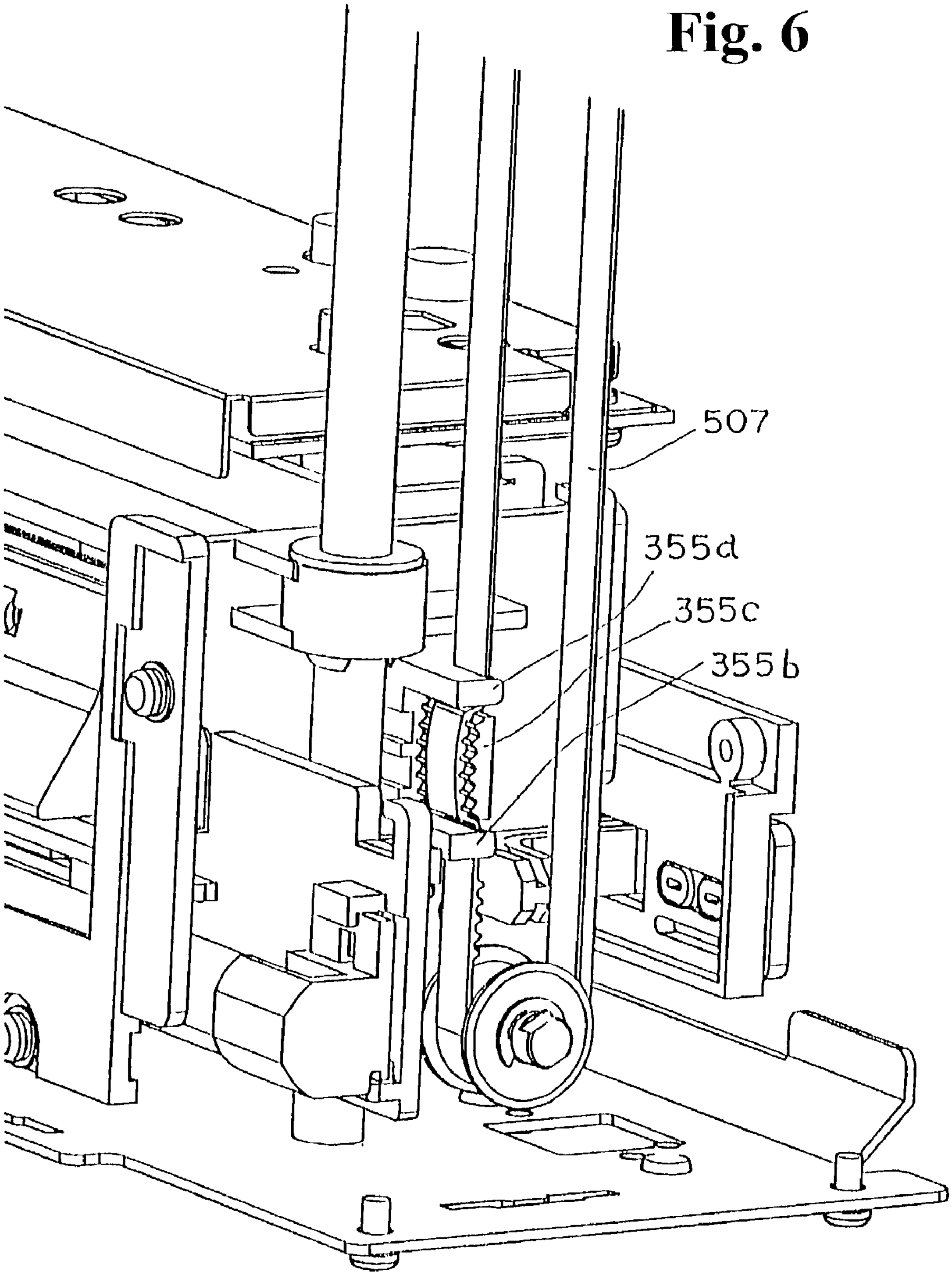
FIG. 6 is a perspective view showing a joint portion of the carriage and a transfer belt of the embodiment of the invention in FIG. 2.

Also, as shown in FIG. 5, on the side surface of the carriage frame 302, cylindrical supporting members 350, 351 integrally formed with the carriage frame 302 are disposed with a space therebetween in a vertical direction, and a guide shaft 333, described later, fits the supporting members 350, 351. Incidentally, cylindrical sliding members 352, 353 are disposed on an inner periphery contacting the guide shaft 333 of the supporting members 350, 351, respectively. Also, a combining member 355 to be combined with a transfer belt 321, described later, is formed between the supporting members 350, 351. As shown in FIG. 6, the combining member 355 is formed of two engaging portions 355*a*, 355*b* with a space therebetween, and a tooth portion 355*c* wherein gear teeth are formed on an R-shape surface to be engaged with the gear teeth of the transfer belt 321.

A cylindrical supporting member is formed integrally with the carriage frame 302 on a side surface opposite to the carriage frame 302, and the supporting member engages the guide shaft 334 to thereby prevent the carriage 301 from moving, and to maintain a predetermined distance between the contact glass 300 and the carriage 301. A sliding member is also disposed on an inner periphery of the supporting member.

The image reading unit 3, as shown in FIGS. 4 and 5, includes plate-like upper and lower frames 331, 332 attached to upper and lower ends of the frame 350. A pair of rod guide shafts 333, 334 parallel to the contact glass 300 and perpendicular to the upper and lower frames 331, 332 is fixed to the frames 331, 332. The guide shafts 333, 334 are disposed in parallel to each other. With the guide shaft 333 engaging the supporting members 350, 351 formed on the side surface of the carriage frame 302, the carriage 301 is supported to be able to slide vertically along the guide shaft 333. The supporting members 350, 351 engage the guide shaft 333 through the sliding members 352, 353. Due to a dimensional deviation between the guide shaft 333 and each of the sliding members 352, 353, when the carriage 301 is moved, wobbling (vibration) may occur. The wobbling becomes larger when the carriage 301 moves downward than upward. Therefore, in the present embodiment, as described later, in order to reduce the influence of the vibration to the image quality, the reading scan of the photograph is carried out while the carriage moves upward. Incidentally, it is of course possible to carry out the reading scan while the carriage is moving downward.

Next, with reference to FIG. 7, a driving system 310 of the image reading unit 3 will be described.

The driving system 310 is attached to an upper portion of the side surface of the frame 350. The driving system 310 includes a carriage motor M2 rotatable both forward and in reverse for moving the carriage 301; a rotating shaft 313 attached to an upper portion of the carriage motor M2; pulleys 314, 315 disposed to the rotating shaft 313; a rotating shaft 317 (the first rotating shaft) attached to an upper portion of the rotating shaft 313; pulleys 318, 319 attached to the rotating shaft 317; a rotating shaft 321 (the second rotating shaft) attached to a lower portion of the frame 350; and a pulley 320 attached to the rotating shaft 321. The driving system 310 also includes a timing belt 312 extending between a rotating shaft 311 of the carriage motor M2 and the pulley 314; a timing belt 316 extending between the pulley 315 and the pulley 318; and a transfer belt 321' (an endless belt) constituted of a timing belt extended between the pulleys 319 and 320. The carriage 301 is linked via the combining member 355 to a side of the transfer unit 3 of the transfer belt 321 (refer to FIG. 7). The carriage 301 and the transfer belt 321', as shown in FIG. 6, are connected such that a portion of the transfer belt 321 is sandwiched between engaging portions 355*a*, 355*b* and the tooth-form portion 355*c* opposite thereto.

The drive of the carriage motor M2 is transmitted to the rotating shaft 313 through the rotating shaft 311, the timing belt 312 and the pulley 314. The drive transmitted to the rotating shaft 313 is further transmitted to the rotating shaft 317 through the pulley 315, the timing belt 316 and the pulley 318. The transfer belt 321' is rotated by the drive transmitted to the rotating shaft 317 through the pulley 319. Therefore, the transfer belt 321' is rotated in a clockwise direction by the forward drive of the carriage motor M2 to move the carriage 301 upward, and is rotated in a counterclockwise direction by the reverse drive of the carriage motor M2 to move the carriage 301 downward.

Figure 7:
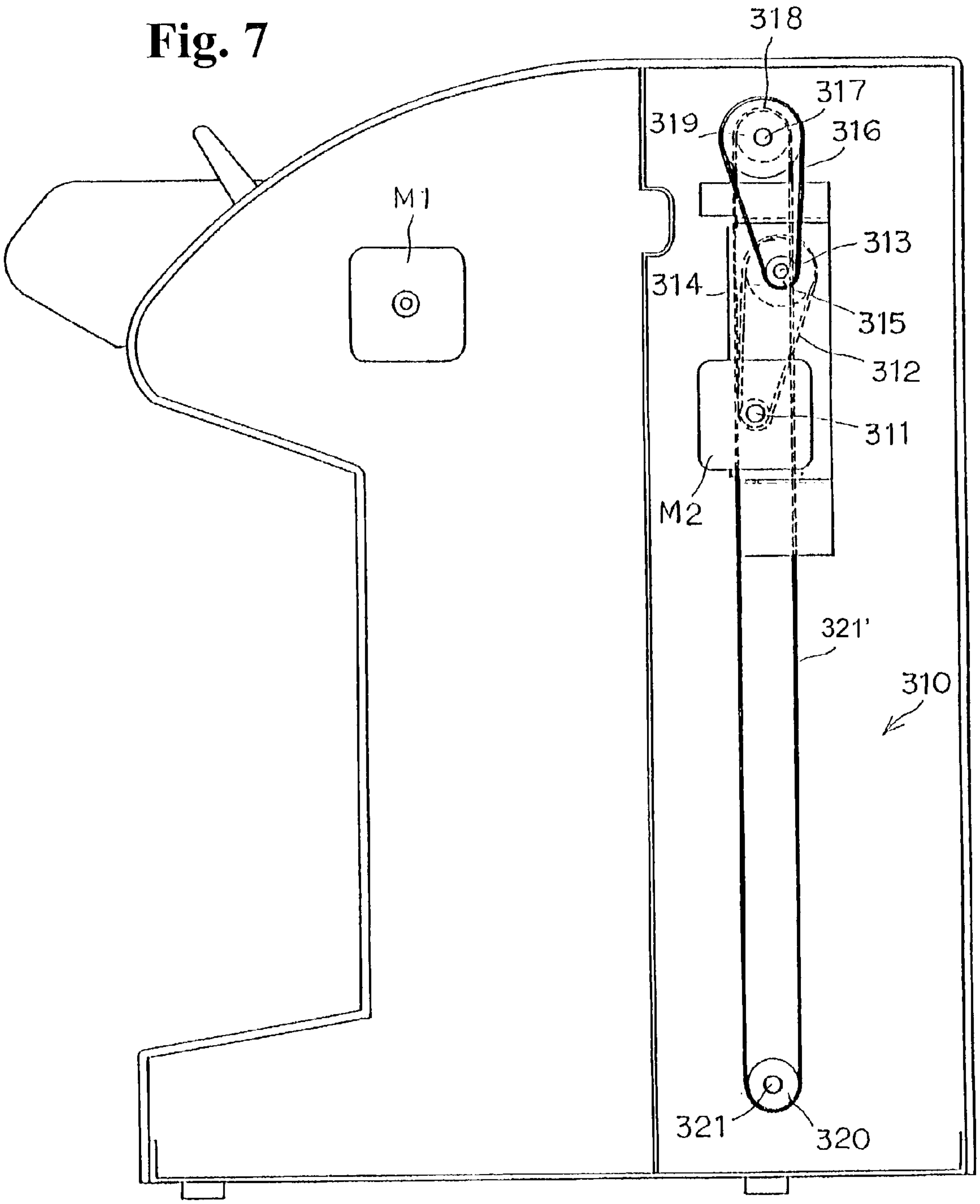
FIG. 7 is a side sectional view showing a driving system of an image reading unit according to the embodiment of the invention in FIG. 2.

Also, as described above, since the transfer belt 321' is rotated through the rotation of the rotating shaft 317, when the transfer belt 321' is rotated in the clockwise direction, tension is applied to a belt on a side of the transfer unit 3 (left side in FIG. 7). When the transfer belt 321' is rotated in the counter-clockwise direction, the tension is applied to a belt on a side opposite to the transfer unit 3 (right side in FIG. 7). Therefore, since the carriage 301 is connected to the left side of the transfer belt 321', the carriage 301 moves in a more stable manner with less vibration when the tension is applied to the left side of the transfer belt 321', i.e. when the transfer belt 321' is rotated in the clockwise direction and the carriage 301 is moved upward. Thus, in the present embodiment, as described later, while moving upward, the carriage 301 reads the photograph so that the vibrations has a less influence on the image quality during the carriage 301 moving.

With the structure described above, the carriage 301 moves vertically along the contact glass 300 through the drive of the carriage motor M2. The movement of the carriage 301, as shown in FIG. 3, ranges from a home position H near a lower portion of the white reference plate 323 to a vicinity of the upper end of the contact glass 300.

The home position H is a position where the carriage 301 stays at such an idle time when no power is supplied to the image reading apparatus 1, or the image reading apparatus 1 stands by without performing a reading operation even with the power on. As described above, the carriage 301 has a large weight due to a plurality of parts for reading the photograph, such as a light source 303 and a lens unit 308. Therefore, by holding the carriage 301 at a position lower than the central position M (a substantially central position of the image reading apparatus 1) of the platen glass 300 near a center in a height direction of the image reading apparatus 1 at an idle time, a center of gravity of the entire image reading apparatus 1 is lowered to thereby make it stable. Thus, in the present embodiment, since the lowest position of the operation range of the carriage 301 is set as the home position H, the image reading apparatus can be more stable. Incidentally, a transmission type home position sensor 330 (refer to FIG. 3) is installed at a lower end of the apparatus for detecting the carriage 301 being at the home position H.

Also, as shown in FIG. 3, a terminal reference position T as a standard for stopping the photograph transferred by the transfer unit 2 is set near a lower end of the contact glass 300. When a leading edge of the photograph abuts against a stop device, described later, provided at the terminal reference position T, the photograph stops at a reading position 800 provided in the second transfer path 507 formed by the contact glass 300 and the transfer belt 505, described later. The terminal reference position T is also set as a reading start position S of the carriage 301. It is preferable to provide the terminal reference position T at a position closer to a lower end surface of the contact glass 300 to reduce an apparatus size (shortening the contact glass 300). However, with respect to the picture quality, it is preferable that the reading start position S is located properly away from the lower end surface of the contact glass 300 in order to avoid an influence such that a portion of the light from the light source 303 is reflected by the lower end surface of the contact glass 300 so that the light is not irradiated to a predetermined position. Therefore, in the present embodiment, the terminal reference position T and the reading start position S are set at a position about 13 mm away from the lower end surface of the contact glass 300.

As shown in FIG. 3, the transfer unit 2 includes a hand-feed photograph supply portion 10 with a hand-feed photograph supply port 10C formed at an upper end of the contact glass 300; a transfer path 700 having the first transfer path 109 and the second transfer path 507, described later, for guiding the photograph from the hand-feed supply port 10C to the reading position 800 (the terminal reference position T) along the contact glass 300; a photo-transfer portion 50 integrated to be a unit (a transfer unit 573) for transferring the photograph along the transfer path 700; an automatic photo-supply portion 20 for supplying a photograph shorter than a specific length to the second photo-transfer path 507 from a space between the hand-feed supply portion 10 and the photo-transfer portion 50; and a discharge portion 60 for discharging the photograph after the carriage 301 reads the image thereon.

Incidentally, a photograph shorter than the specific length (hereinafter referred to as a "S size photograph") includes, for example, E size (88 mm×117 mm), L size (88 mm×127 mm), 4R size (4 inch×6 inch=101.6 mm×152.4 mm), a high-vision size (88 mm×156 mm), an instant photograph small (86 mm×54 mm), and an instant photograph large (86 mm×108 mm). The photograph longer than the specific length (hereinafter referred to as a "panorama photograph") includes, for example, a panorama photograph (88 mm×254 mm).

The hand-feed supply portion 10 has a cover 101 for opening and closing by rotating around a rotating shaft 102 with a hand; the hand-feed supply port 10C for inserting the panorama photograph; a guide portion 110 for guiding the panorama photograph into the hand-feed supply port 10C; a frame 108 having a hand-feed supply tray 108*a* for placing (supporting) the panorama photograph, and a guide frame 108*b* disposed with a predetermined space away from an upper surface of the contact glass 300, with an acute angle bent portion in the middle (refer to FIG. 8); the second suction portion 150 integrally formed with the frame 108 for sucking the panorama photograph; and an empty sensor 111 disposed in a vicinity of the upper end of the frame 108 for detecting the panorama photograph.

The cover 101 can be opened or closed by a hand as described above. The cover 101 can prevent a foreign matter, such as dust, from entering the image reading apparatus 1 through the hand-feed supply port 10C at such an idle time when the panorama photograph is not placed on the hand-feed supply tray 108*a*, or can prevent outer light from entering the image reading apparatus 1 while the image is read.

As shown in FIGS. 3 and 4, a guide portion 110 has a group of the rollers 104, 105, 106, 107 attached to the guide member 103 with a substantially triangular cross section as described above. When the panorama photograph is manually inserted into the hand-feed supply port 10C or the panorama photograph is transferred, the group of the rollers 104, 105, 106, 107 directly contacts the surface of the photograph to thereby reduce a contact resistance between the panorama photograph and the guide member 103 and prevent an image surface of the photograph from being scratched.

Figure 8:
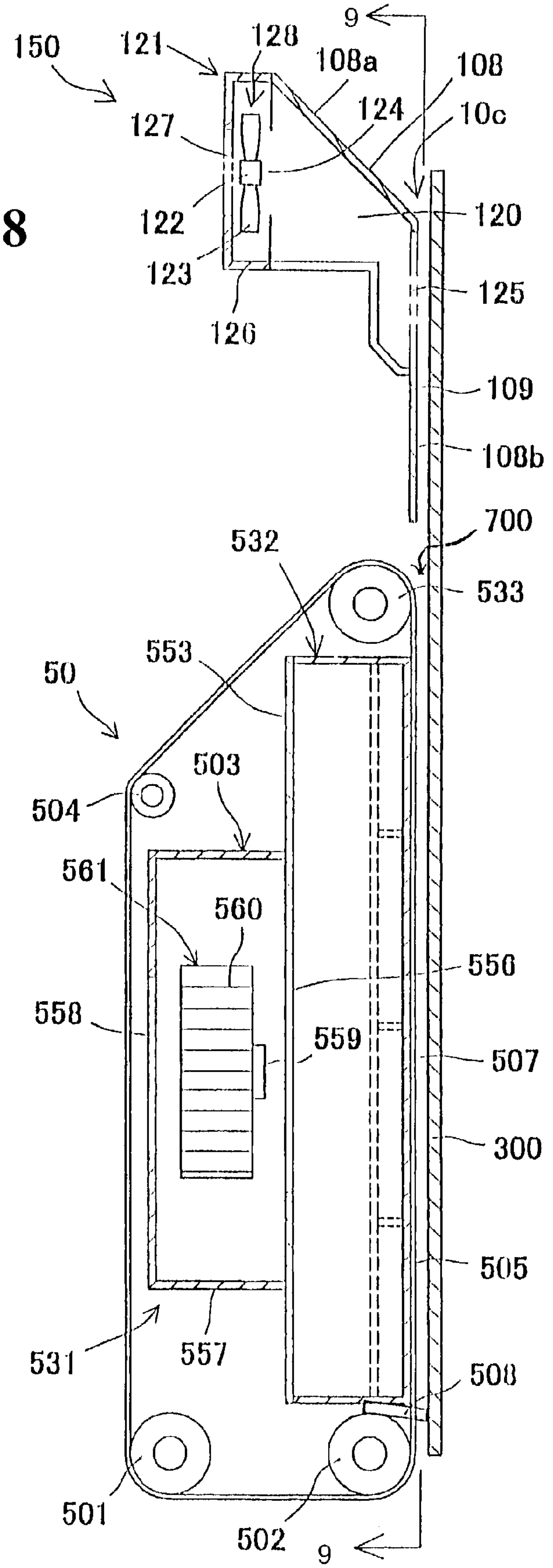
FIG. 8 is a side sectional view showing the first suction portion and the second suction portion according to the embodiment of the invention in FIG. 2.
Figure 9:
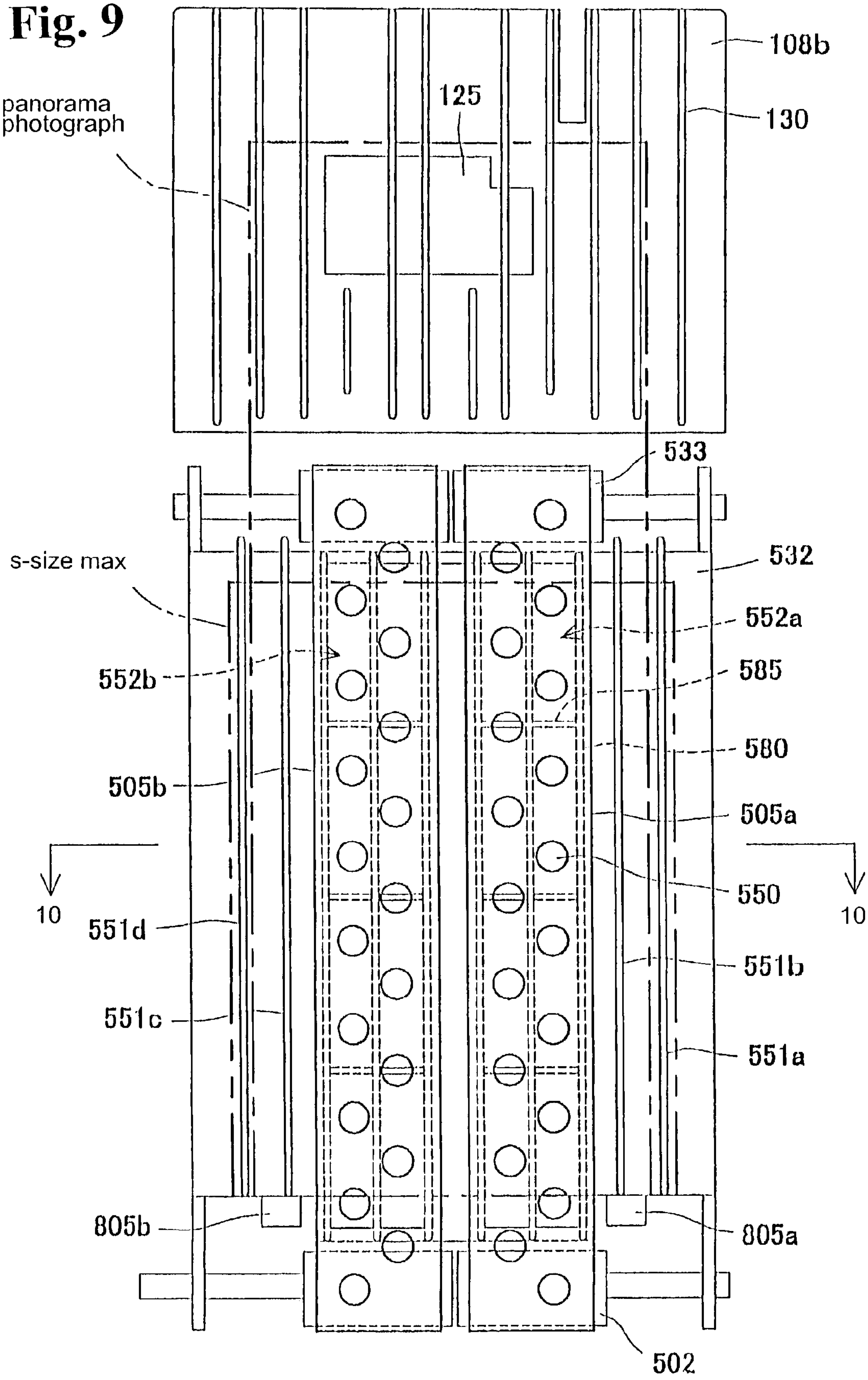
FIG. 9 is a sectional front view showing the first and second suction portions taken along a line 9—9 in FIG. 8.

As shown in FIGS. 3 and 8, the frame 108 has the hand-feed supply tray 108*a* and the guide frame 108*b* integrally made of a black color resin. As described above, the hand-feed supply tray 108*a* located above the bent portion is curved with respect to the transfer path 700 to thereby prevent a foreign matter from directly entering the transfer path 700 from the hand-feed supply port 10C. The guide frame 108*b* located below the bent portion forms the first transfer path 109 together with the surface of the contact glass 300 as an upper side transfer path of the transfer path 700, and, at the same time, functions as a surface for supporting the panorama photograph. As shown in FIG. 9, a plurality of ribs 130 extending in a transfer direction of the panorama photograph is formed on a surface of the guide frame 108*b* facing the contact glass 300, so that contact resistance of the panorama photograph is reduced through linear contact with the ribs 103 during the transfer. Also, an inlet 125 in a substantially square shape at a center of the guide frame 108*b* is formed, and the second suction portion 150 sucks a center portion of the panorama photograph.

As shown in FIG. 8, the second suction portion 150 includes the second suction duct 120 in a bag shape made of a resin integrally with the frame 108, and the second suction fan 121 screwed to a side opposite to the inlet port 125. The second suction fan 121 includes a fan 128 having a plurality of blades 123 around a boss 122 in a box-shape casing 126. The casing 126 has a substantially circular air hole 124 on a side of the second suction duct 120, and a discharge port 127 on a side opposite to the second suction duct 120. Since the air sucked through the inlet port 125 is discharged through the discharge port 127, the panorama photograph is sucked through the inlet port 125 and is held on the ribs 130 of the guide frame 108*b*. The suction force of the second suction portion 150 is set to be weaker than that of the first suction portion 531, described later.

In the present embodiment, a thickness of the photograph is about 0.3 mm, while a space between a surface of the rib 130 and a surface of the contact glass 300 is set at about 1 mm. Accordingly, a surface of the panorama photograph (an image surface) held by the ribs 130 and sucked by the second suction portion 150 is away from the surface of the contact glass 300 by a predetermined distance (i.e. about 0.7 mm).

Figure 12:
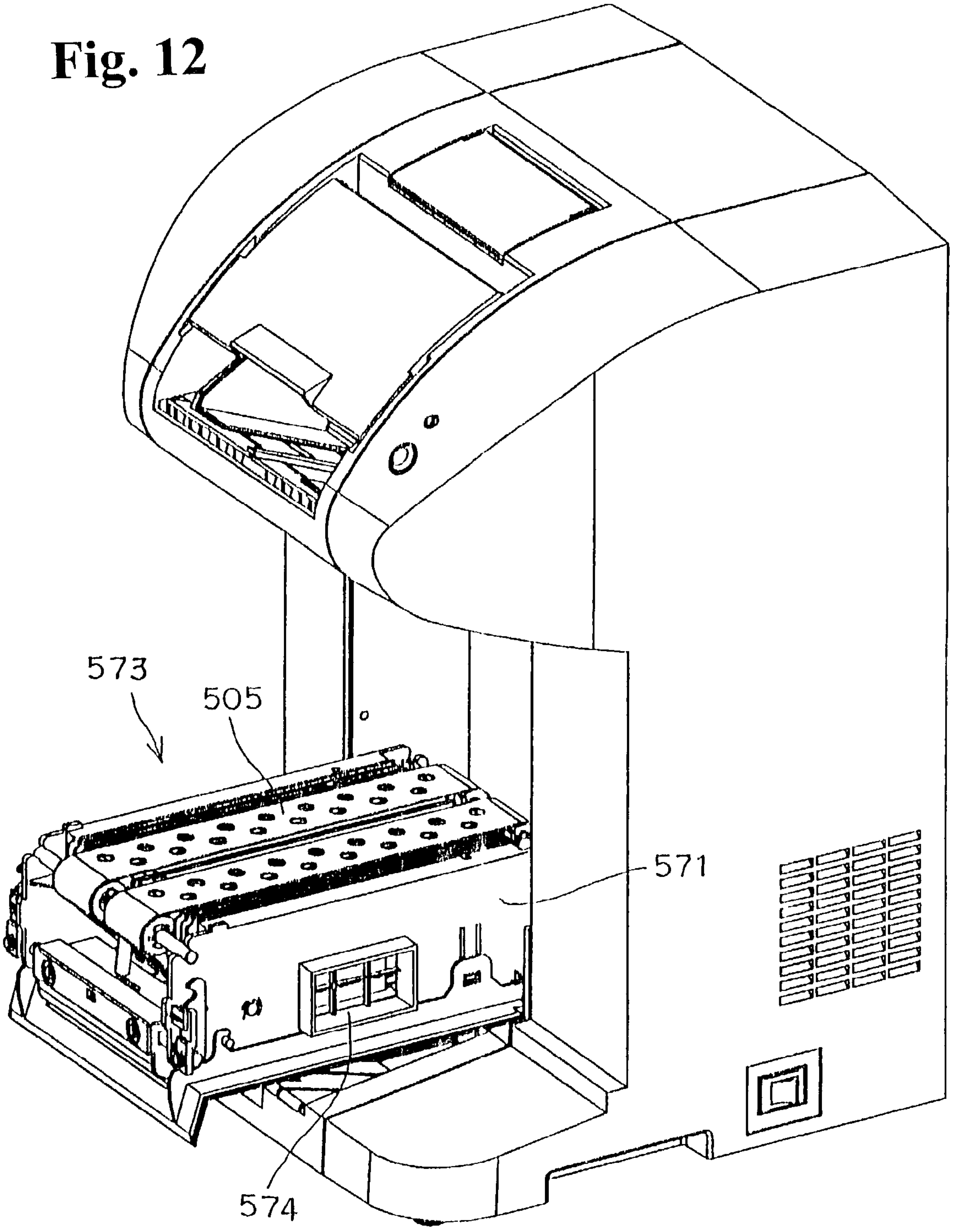
FIG. 12 is a perspective view of an image reading apparatus in a state in which a transfer unit rotates.

The photo-transfer portion 50 has a unit casing 571 made of a black resin with a U-shape cross section as shown in FIG. 12. As shown in FIGS. 3 and 8, disposed inside the unit casing 571 includes rollers 501, 502, 533, 504; an endless belt 505 (transfer belt) extending over these rollers; the first suction portion 531 disposed inside the transfer belt 505 for allowing the photograph sucked to the transfer belt 505; a stop device 508 positioned at a lower portion of the contact glass for moving freely along a transfer path 700 (the second transfer path 507) to stop the photograph at the terminal reference position T (the reading position 800); and a stopper drive system 810 including a transfer motor M1 driving the stop device 508. The unit casing thereby constitutes an integral transfer unit 573.

As shown in FIGS. 3 and 8, a space between the transfer belt 505 and the contact glass 300 forms the second transfer path 507 as a lower side transfer path of the transfer path 700 extending from the first transfer path 109 as described above. As shown in FIG. 9, the transfer belt 505 has a pair of black endless belts 505*a*, 505*b* extending in parallel each other in the transfer direction of the photograph. A plurality of inlet ports 550 is provided on the endless belts 505*a*, 505*b* in two rows in the transfer direction of the photograph. Incidentally, in order to apply tension to the transfer belt 505, the roller 504 is fixed on one side of a lever 510 having a supporting point at a central portion so as to be rotatable around the supporting point, and a predetermined urging force is applied to the other side of the lever 510 through a spring (refer to FIG. 3).

Figure 11:
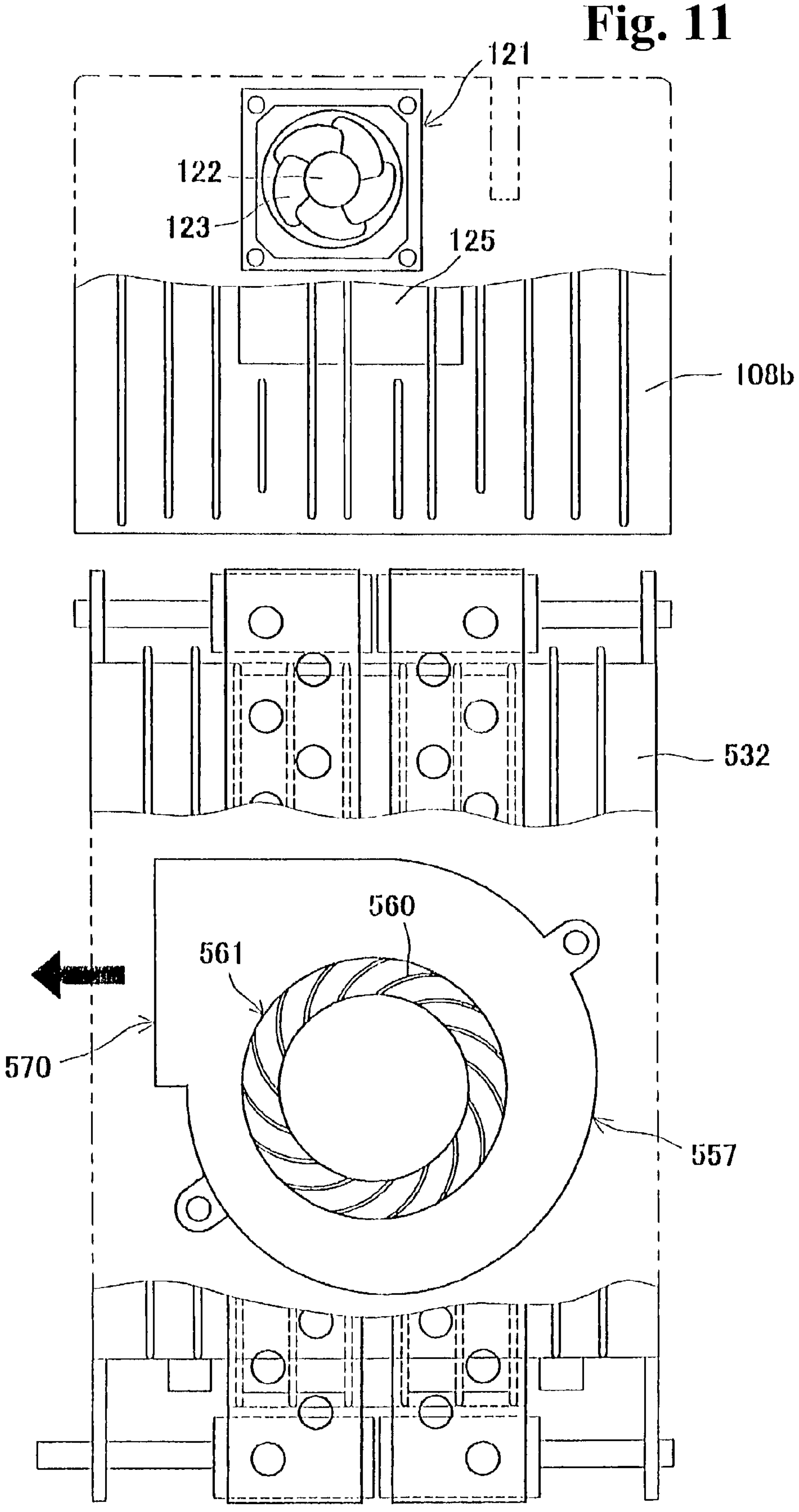
FIG. 11 is a drawing showing a state in which the first suction fan and the second suction fan are installed.

As shown in FIG. 8, the first suction portion 531 includes the first suction duct 532 and the first suction fan 503 having a box-shape made of a black resin and integrally formed with the casing 571. The first suction duct 532 is disposed such that one side facing the contact glass 300 contacts the transfer belt 505 between the rollers 533 and 502 through a beam, described later. An attaching plate 553 provided with a substantially circular air hole 556 at the center thereof is screwed to the other side of the first suction duct 532 with an opening. The first suction fan 503 is fixed to the attaching plate 553 by screws. The first suction fan 503 includes a fan 561 having a plurality of blades 560 around a boss 559 in the box-like casing 557. As shown in FIG. 11, a discharge port 570 for discharging the air sucked in a direction perpendicular to the transfer direction is provided in the casing 557. Further, the air from the discharge port 570 is discharged through the transfer unit 573 from an opening 574 formed on a side surface of the casing 571.

As shown in FIG. 9, the first suction duct 532 has two longitudinal suction ports 552*a*, 552*b* extending in the transfer direction at about the center on a side facing the contact glass 300. The endless belts 505*a*, 505*b* are extended over the rollers 533, 502 to cover the suction ports 552*a*, 552*b*. As described above, inlet holes 550 are formed in two rows along the suction ports 552*a*, 552*b* on the endless belts 505*a*, 505*b*, respectively. Therefore, through operation of the first suction fan 503 (rotation of the fan 561) the photograph is sucked to the transfer belt 505 through the inlet holes 550 of the endless belts 505*a*, 505*b* and the suction ports 552*a*, 552*b* of the first suction duct 503.

The first suction duct 532 has four ribs 551*a*, 551*b*, 551*c*, 551*d* extending in the transfer direction on both outsides of the suction ports 552*a*, 552*b*. These ribs support both sides of the photograph outside of an area supported by the endless belts 505*a*, 505*b* disposed at middle, and reduce the contact resistance between the photograph surface and the first suction duct 532 during transfer due to linear contact between the first suction duct 532 and the photograph to thereby prevent the photograph from skewing.

Figure 10:
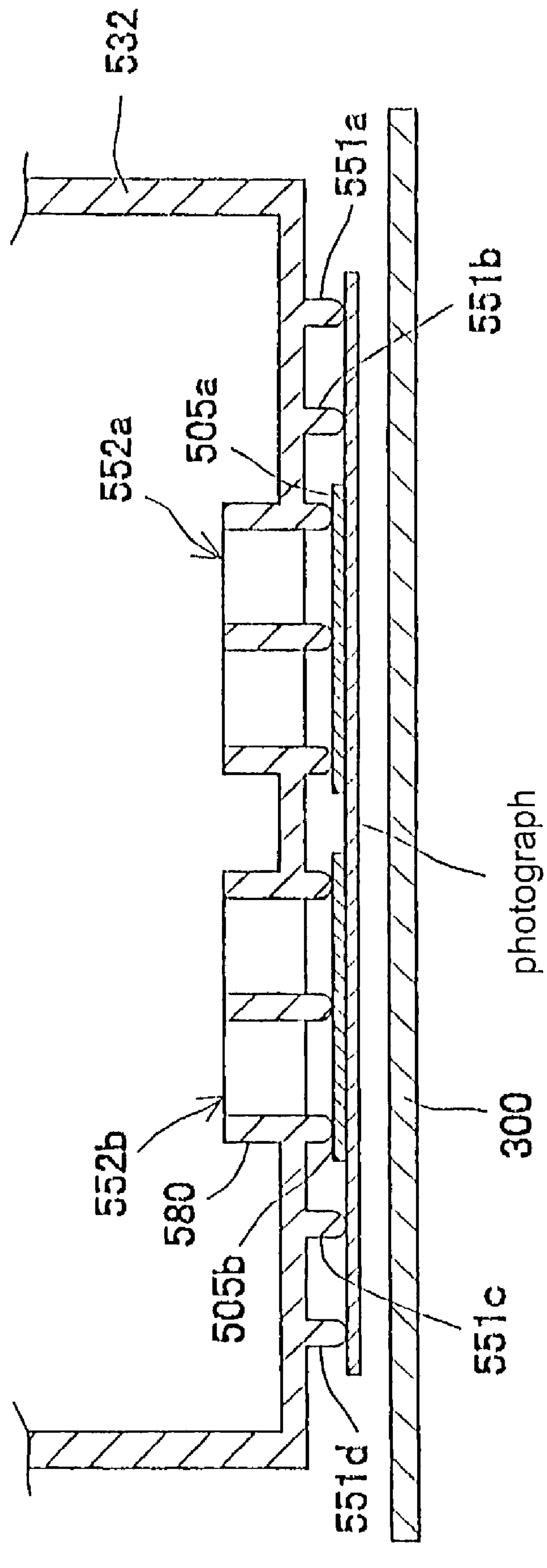
FIG. 10 is a sectional view showing the first suction portion taken along a line 10—10 in FIG. 9.

On the surface of the first suction duct 532 facing the contact glass 300, three vertical beams 580 extending in the transfer direction at both side edges and the center of each of the suction ports 552*a*, 552*b*, and three horizontal beams 585 perpendicular to the vertical beams 580 are formed. As shown in FIG. 10, each of the vertical beams 580 and the horizontal beams 585 projects toward the contact glass 300 from the surface of the first suction duct 532 to support the endless belts 505*a*, 505*b*. Therefore, the contact area between the surface of the endless belts 505*a*, 505*b* and the first suction duct 503 is reduced to thereby minimize the contact resistance. Two of the vertical beams 580 disposed at the center of the suction ports 552*a*, 552*b* among six thereof and six of the horizontal beams 585 support the endless belts 505*a*, 505*b* to prevent deformation of the belts by suction to thereby prevent the photograph from bending.

As shown in FIG. 10, a height (a length) of the ribs 551*a* to 551*d* from the first suction duct 532 is set to be equal to a sum of a height of the vertical beam 580 (the horizontal beam 585) from the first suction duct 532 and a thickness of the endless belts 505*a*, 505*b*. Accordingly, the photograph can be flat when sucked by the endless belts 505*a*, 505*b*. A distance between the surfaces of the transfer belt 505 and the contact glass 300 as well as a distance between the surfaces of the ribs 551*a* to 551*d* and the contact glass 300 are set to be about 1.0 mm as in the hand-feed supply portion 10 described above. Therefore, when the photograph is sucked to the transfer belt 505 by the first suction portion 531 and is supported by the ribs 551*a* to 551*d*, a distance between the surfaces of the photograph and the contact glass 300 is a predetermined length (about 0.7 mm). The panorama photograph sucked by both the first suction portion 531 and the second suction portion 150 is also supported and held flat at the predetermined distance from the contact glass 300.

As shown in FIG. 9, a length of the transfer belt 505 between the rollers 533 and 502 is set to be longer than a length of the largest S size photograph (MAX) in the transfer direction and to be shorter than a length of the panorama photograph in the transfer direction. In other words, the first suction duct 532 has an enough length to cover a high vision size photograph with the longest (MAX) length in the transfer direction among the S size photographs when a leading edge of the high vision size photograph abuts against the stop device 508 (stop members 508*a*, 508*b*), and to suck a part of a leading edge of the panorama photograph as well. Incidentally, a part of a trailing edge of the panorama photograph is supported by the guide frame 108*b* of the second suction device 150.

Also, color of the first suction duct 503 (the unit casing 571) and the endless belts 505*a*, 505*b* is black to avoid an influence of a background created when the image of the photograph is read. More specifically, since a background color of these members is uniformly black, influences from shadows of the edge portions of the transfer belt and the suction holes can be eliminated. Additionally, when the photograph has a light image (relatively high translucent), a problem where characters or the like on the backside of the photograph can be seen through, i.e. a see-through state, can be prevented. Since the frame 108 is made black as described above, when the panorama photograph is read, it is also possible to eliminate see-through problems caused by an edge portion of the inlet port 125, a lower edge portion of the guide frame 108*b*, an upper side edge portion of the first suction duct 532 and the like.

Next, the stop device 508 will be explained.

Figure 13:
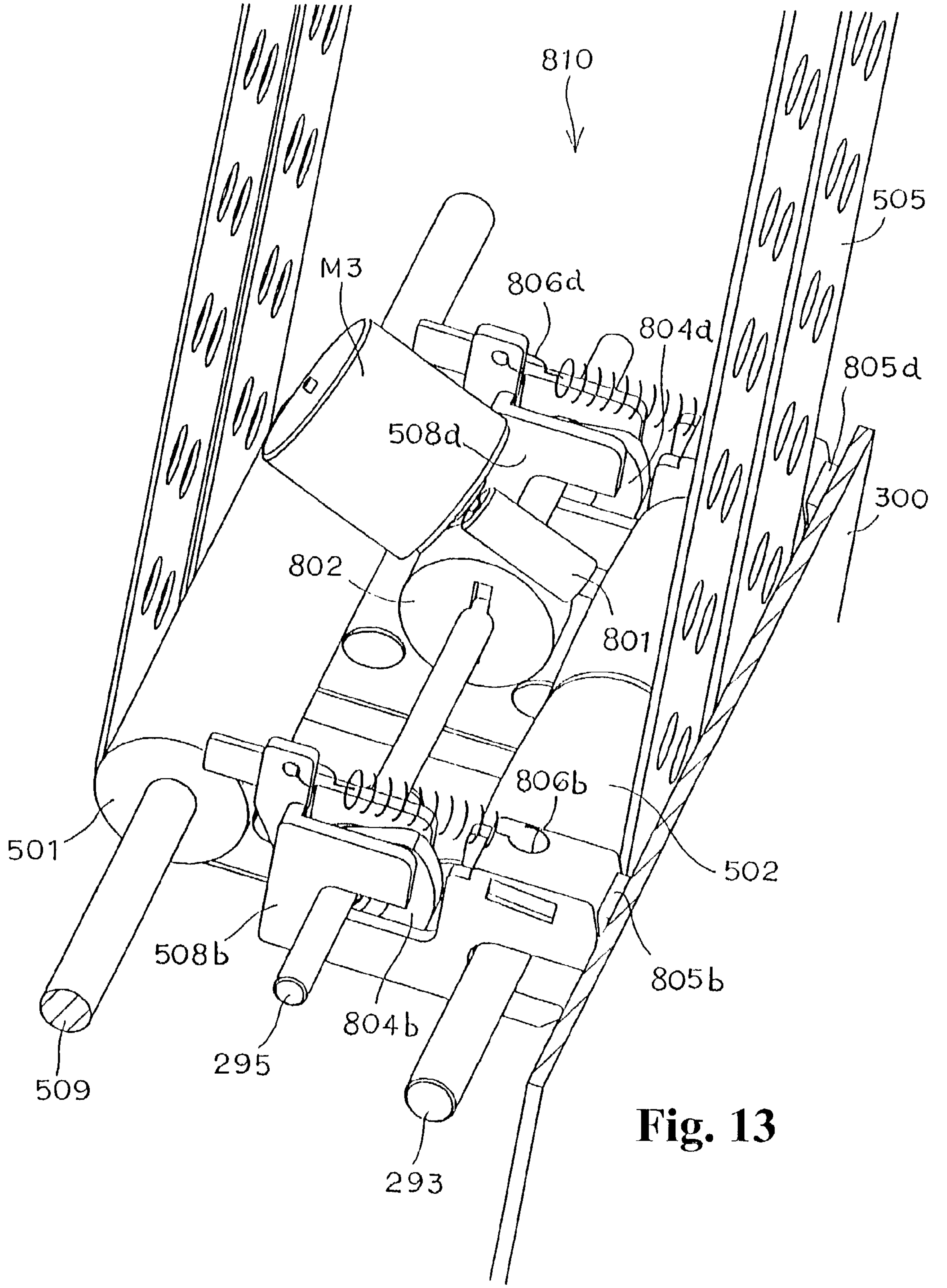
FIG. 13 is a perspective view showing a stop device and its driving system.
Figure 14:
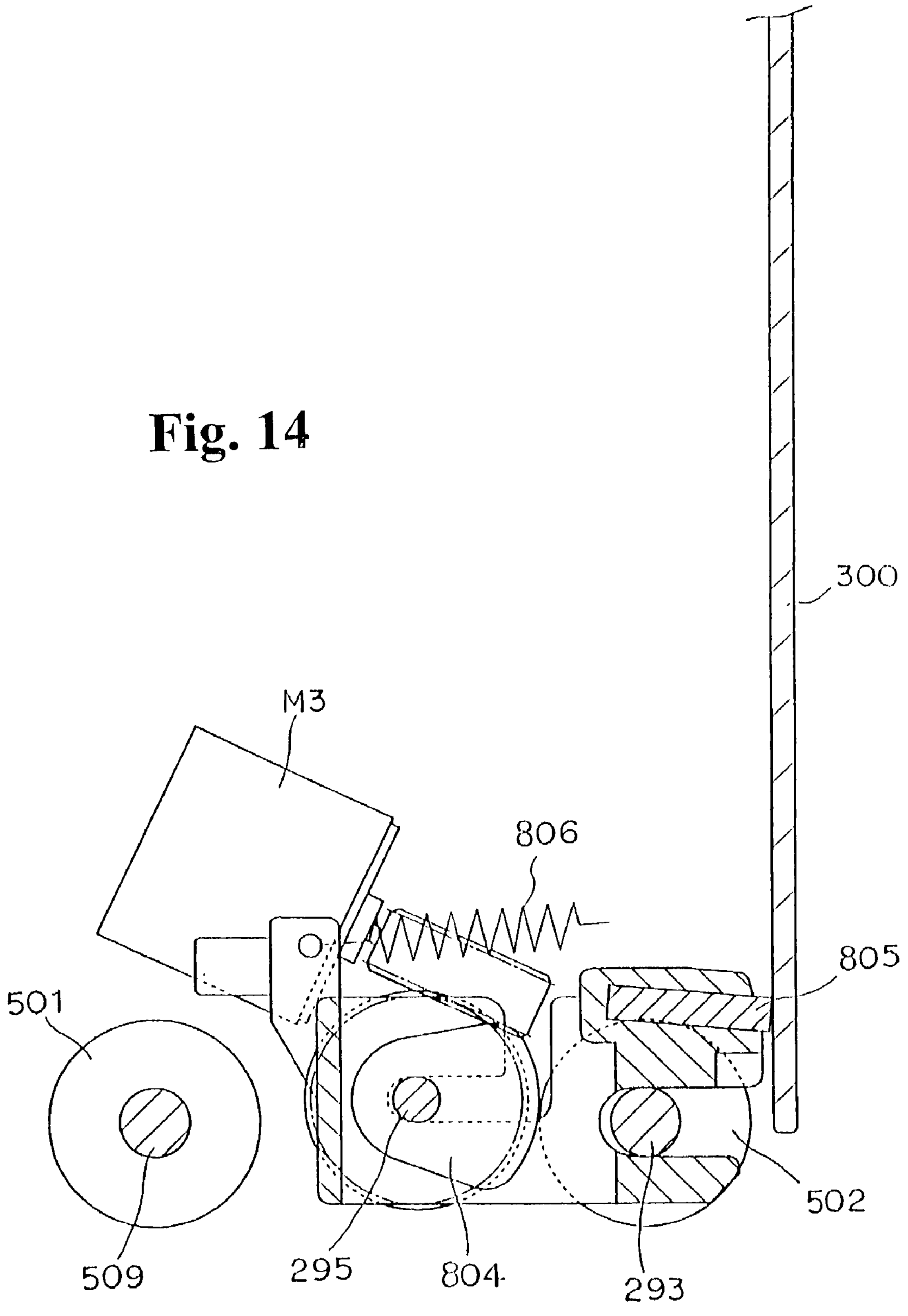
FIG. 14 is a side sectional view showing a stop device and its driving system.

As shown in FIG. 13, the stop device 508 is formed of the stop members 508*a*, 508*b*, in the transfer unit 573, and is disposed between the transfer belt 505. The respective stop members 508*a*, 508*b* are provided with grooves to be engaged with rotating shafts 295, 293, so that the stop members can slide along the grooves. Also, abutting members 805*a*, 805*b* formed of a rubber plate or the like are disposed at an edge of the stop members toward the contact glass 300. The abutting members advance to or retract from the transfer path 700 at the outside of the transfer belt 505. When the stop members 508*a*, 508*b* are moved to the closest position to the contact glass 300, the abutting members 805*a*, 805*b* contact the contact glass 300, so a leading edge of the photograph abuts and stops at the reading position 800 as the terminal reference position T as described above. Thus, since the respective abutting members 805*a*, 805*b* are disposed to advance to or retract at the outside of the transfer belt 505 to thereby abut against outer ends of the photograph, it is possible to correct skewing of the photograph more effectively. The stop members 508*a*, 508*b* are urged toward the contact glass 300 by springs 806*a*, 806*b*, one end of which is connected to the unit casing 571.

The transfer unit 573 engages a rotating shaft 509 disposed under the transfer unit 573, and the roller 501 with the transfer belt 505 therearound is attached (refer to FIG. 3) to the transfer unit. The transfer unit 573 can be rotated downward around the rotating shaft 509 as a shaft thereof. Therefore, as shown in FIG. 12, by rotating around the rotating shaft 509, the second transfer path 507 can be opened with moving the transfer belt 505, so that a paper jam can be easily removed. Further, as shown in FIG. 12, when the second transfer path 507 is opened, since the transfer unit 573 stays on the photograph discharge tray 601 (a lower position of the image reading apparatus 1), the apparatus stays in a stable manner. The transfer path 507 can be kept opening without using any other tool, such as a stopper.

As shown in FIG. 3, the automatic photo-supply portion 20 is positioned on an upper side of the transfer portion 50. The automatic photo-supply portion 20 includes a manually operated photo-supply tray cover 200; a photo-supply tray 202 on which a plurality of the S-size photographs can be placed; an insertion port 20C to which each of the S-size photographs on the photo-supply tray 202 can be inserted; guides 204, 205 for guiding the S-size photograph inserted through the insertion port 20C toward a downstream side; a photo-supply portion 21 for supplying the S-size photograph along a photo-supply path 203 formed by the guides 204, 205; and an empty sensor 206 for detecting the S-size photograph on the photo-supply tray 202.

The photo-supply tray 202 is disposed substantially perpendicular to the contact glass 300 at an upper portion of the transfer belt 505 and projects opposite to the image reading unit 3. The photo-supply tray 202 includes a spring 230 for pressing from a lower side and a rotating shaft 231. The spring 230 urges the photo-supply tray 202 upward with the rotating shaft 231 as a center.

A photo-supply tray cover 200 rotates around a rotating shaft 235 as a pivot, and includes a lever 232 that rotates with engaging the photo-supply tray cover 200. The lever 232 rotates around the rotating shaft 233, and can be engaged with an engaging pin 234 integrally formed with the photo-supply tray 202. When an operator opens the photo-supply tray cover 200, the lever 232 is pressed down. Further, the engaging pin 234 is pressed downward by the lever 232, and the photo-supply tray 202 is lowered so that the S-size photograph can be placed thereon. On the other hand, when the photo-supply tray cover 200 is closed, the lever 232 is raised so that the lever 232 is not engaged with the engaging pin 234 and the photo-supply tray 202 becomes free. At this time, the photo-supply tray 202 is lifted by the spring 230, so that a pick-up roller 250 contacts an uppermost surface of the S-size photograph placed on the photo-supply tray 202, described later.

The photo-supply path 203 is formed of the guides 204, 205 disposed separately with a predetermined space therebetween. The photo-supply path 203 is curved for guiding the S-size photograph placed on the photo-supply tray 202 from the insertion port 20C to an automatic photo-supply port X formed between the transfer belt 505 and the guide frame 108*b*. Rollers 210, 211, 212, 213 for guiding the S-size photograph while gradually changing a direction thereof toward the contact glass 300 are disposed near the automatic photo-supply port X and an upper end of the contact glass 300. These rollers 210, 211, 212, 213 overlap each other in outer peripheries of the adjacent rollers to be in a zigzag pattern. Therefore, a surface of the S-size photograph is less damaged or stained. On a position opposite to the driven rollers, a timing sensor 207 is disposed for detecting a leading edge and a trailing edge of the S-size photograph through its on and off operations.

The photo-supply portion 21 includes a pick-up roller 250W for picking up the S-size photograph on the photo-supply tray 202; a photo-supply roller 251W for transferring the S-size photograph toward a downstream side; a separating roller 252W for separating the S-size photographs together with the photo-supply roller 251W one by one; resister rollers 253, 254 for correcting an inclination (skew) of the S-size photograph and transferring it toward the downstream side; and a guide roller 255 for reducing contact resistance between the S-size photograph and the guide 205.

These rollers are disposed along the guides 204 and 205. The S-size photograph placed on the photo-supply tray 202 is inserted into the transfer path 700 (the second transfer path 507) through the photo-supply path 203 and the automatic photo-supply port X by the transfer motor M1, described later.

A discharge portion 60 is positioned under the transfer portion 50. The discharge portion 60 includes an discharge tray 601 disposed under the transfer belt 505 for receiving the photograph thereon after reading the image on the photograph by the carriage 301; a rotor supporting member 615 disposed under the contact glass 300 as described above; a photo-discharge portion 61 disposed at a downstream side of the rotor supporting member 615 for guiding the photograph along a photo-discharge path 604 toward the photo-discharge tray 601; and a photo-discharge sensor 613 for detecting a trailing edge of the photograph.

Incidentally, similar to the photo-supply tray 202, the photo-discharge tray 601 is positioned on one side of the image reading apparatus 1 (a side opposite to the image reading unit 3) and is substantially perpendicular to the contact glass 300. Therefore, the photograph can be set and taken out from the same side to thereby improve its operation ability. Further, since the photo-supply tray 202 and the photo-discharge tray 601 are substantially perpendicular to the contact glass 300 (substantially parallel to the installation surface of the image reading apparatus 1), even if the image reading apparatus 1 is installed on an elevated place, such as a shelf, the photograph can be easily set and taken out.

The photo-discharge portion 61 includes a curved guide 603 forming one side of the photo-discharge path 604; rollers 605, 606, 607 disposed along the guide 603; and a photo-discharge belt 612 forming the other side of the photo-discharge path 604, and having a curved shape through being pulled by the pulleys 608, 609, 610, and pushed by the rollers 605, 606, 607. A photo-discharge sensor 613 facing the photo-discharge path 604 is disposed between the driven rollers 606 and 607. Also, as described above, under the contact glass 300, a plurality of the rollers 602 (the driven rotors) is disposed in a zigzag pattern wherein outer peripheries of the adjacent rollers continuously overlap each other in a photo-transfer (photo-discharging) direction in order to avert the photograph. As described above, since a plurality of the rollers 602, which rotates along with the transferred photograph, are provided on a side of the curved photo-discharge path for contacting the photograph surface (an image surface), it is possible to reduce a scratch or a stain on the photograph surface.

Figure 15:
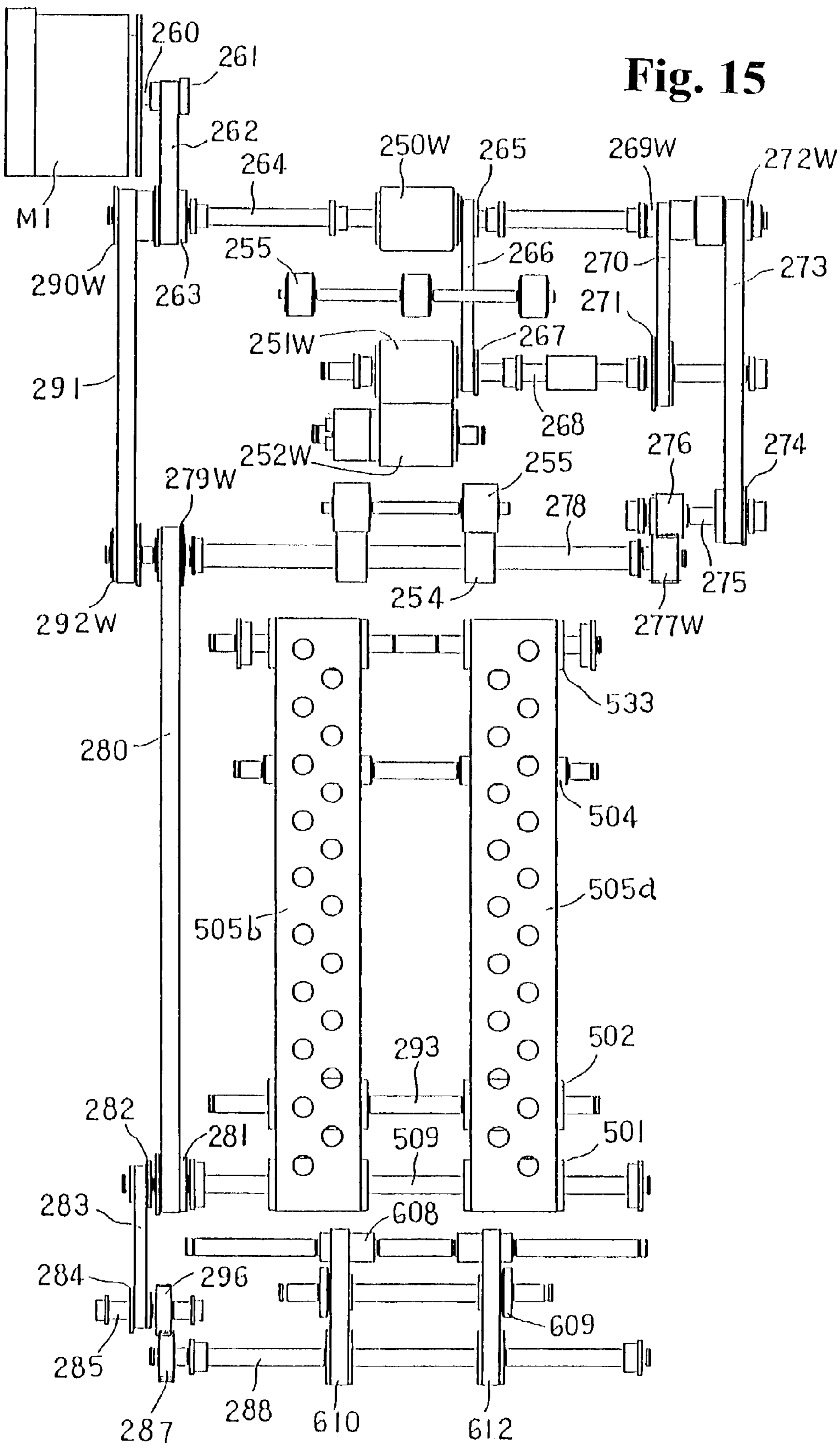
FIG. 15 is a drawing showing a driving system of a transfer unit.

Next, with reference to FIG. 15, a driving system of the photo-transfer unit 2 will be explained.

The photo-transfer unit 2 has the transfer motor M1 rotatable both forward and in reverse (refer to FIG. 7).

The forward drive of the transfer motor M1 is transmitted to a rotating shaft 264 through a rotating shaft 260, a pulley 261, a timing belt 262 and a pulley 263 to rotate a pick-up roller 250W (with a one-way clutch) attached to the rotating shaft 264 in the transfer direction. A pulley 290W (with the one-way clutch) does not receive the drive due to the one-way clutch. Further, the drive transmitted to the rotating shaft 264 is transmitted to a rotating shaft 268 through a pulley 265, a timing belt 266 and a pulley 267 to rotate a photo-supply roller 251W (with the one-way clutch) attached to the rotating shaft 268 in the transfer direction along with a separation roller 252W. Further, the drive transmitted to the rotating shaft 264 is transmitted to a rotating shaft 278 through a pulley 272W (with the one-way clutch), a timing belt 273, a pulley 274, a rotating shaft 275, gears 276, 277W to rotate a resister roller 254 formed of two rollers attached to the rotating shaft 278 in the transfer direction. Incidentally, the forward drive thereof is not transmitted to the pulleys 279W, 292W provided to the rotating shaft 278 due to the one-way clutch.

When the transfer motor M1 rotates in reverse, in the same manner as in the forward drive, the drive is transmitted to the rotating shaft 264 through the rotating shaft 260, the pulley 261, the timing belt 262 and the pulley 263. Further, the drive transmitted to the rotating shaft 264 is transmitted to the rotating shaft 278 through the pulley 290W, a timing belt 291 and the pulley 292W to rotate the resister roller 254 formed of two rollers and provided to the rotating shaft 278 in the transfer direction. Therefore, the resister roller 254 rotates in the same direction in both forward and reverse drives of the transfer motor M1. Incidentally, the reverse drive transmitted to the rotation shaft 278 is not transmitted to the gear 277W by the action of the one-way clutch. Further, the drive transmitted to the rotating shaft 278 is transmitted to a rotating shaft 509 through the pulley 279W (with one-way clutch), a timing belt 280 and a pulley 281 to rotate two rollers 501 attached to the rotating shaft 509. Accordingly, a transfer belt 505 (505*a*, 505*b*) extended over the rollers 501, 502, 504 and 533 rotates in the transfer direction. Further, the drive transmitted to the rotating shaft 509 is transmitted to a rotating shaft 288 through a pulley 282, a timing belt 283, a pulley 284, a rotating shaft 285, gears 296, 287 to rotate a roller 610 attached to the rotating shaft 288. Accordingly, a photo-discharge belt 612 extended over the pulleys 608, 609 and 610 rotates in the transfer direction.

As described above, the pick-up roller 250, the transfer roller 251W (the separation roller 252) and the resister roller 254 (resister roller 253) rotate in the transfer direction through the forward drive of the transfer motor M1. The resister roller 254 (the resister roller 253), the transfer belt 505 and the discharge belt 612 rotate in the transfer direction through the reverse drive of the carriage motor M2.

Incidentally, the pulley 281, the rotating shaft 509, the roller 501, the rotating shaft 293, the rollers 502, 504, a rotating shaft to which the roller 504 is fixed, the roller 533, a rotating shaft to which the roller 533 is fixed, and the transfer belt 505 are housed in the transfer unit 573 for transmitting the drive to the transfer belt 505.

Next, a stopper drive system 810 as a drive system of the stop device 508 will be explained.

As shown in FIG. 13, a stopper motor M3 for driving the stop device 508 is disposed between the transfer belts 505 in the transfer unit 573. The drive of the stopper motor M3 is transmitted to the rotating shaft 295 through a worm gear 801 and a gear 802 attached to the rotating shaft 295. Further, cams 804*a*, 804*b* attached to the rotating shaft 295 rotate to thereby engage stop members 508*a* and 508*b*, respectively, so that the respective cams 804*a*, 804*b* slide along grooves to allow the respective abutting members 805*a*, 805*b* to advance into or retreat from the transfer path 700 (the second transfer path 507).

The photograph reading apparatus 1, as shown in FIG. 16, is provided with a control board 400. The control board 400 includes a CUP 401; a line correction SRAM 402; a hading correction SRAM 403; a gamma correction SRAM 404; a transmission buffer SDRAM 405; an image data process IC 406; a forwarding data process IC 407; a ROM 408; a SRAM 409; an EEPROM 410; a motor driver 411 for driving motors; a SCSI-2 interface 412 to which a control device 430 is connected; and an IEEE 1394 interface 413.

The control board 400 is connected to an AC power source. Further, a fan driver 860 for controlling a switching operation of the first suction fan 503 and the second suction fan 121 is provided to the control board 400.

The CPU 401 executes a program stored in the ROM 408, and drives the transfer motor M1, the carriage motor M2 and the like after receiving information from various detecting sensors to thereby transfer and read the photograph.

The line space correction SRAM 402 is correcting spaces between the three lines RGB picture element rows. In output data from an image sensor 309, wherein the RGB picture element rows are constituted with a predetermined distance therebetween, assuming data in the first picture element row is the N-th line at a certain time t0, the second picture element row is the (N−n)-th line, and the third picture element row is the (N−2n)-th line. The line space correction is for temporarily storing previous data and outputting the same line data at the same timing, and is constituted of a memory element for storing the previous data.

The shading correction SRAM 403 is a memory element for storing black and white standards of all picture elements of the RGB colors required for the correction when the shading correction is performed in order to remove influences of optical system variations and sensitivity irregularities of the image sensor 309.

It is necessary to perform the gamma correction to the image input data in order to correct a linearity of the color gradation of the obtained image data or to obtain a desired output. The gamma correction SRAM 404 is a memory element for storing a look-up table to convert to any desired data by using the look-up table for the each color data from 0 to 4095.

The transfer buffer SDRAM 405 temporarily stores data to be transferred to the control device 430. The final data is transferred to the control device 430 through a SCSI-2 interface 412. When a data transfer time is longer than a data reading time, it is required to interrupt the reading. Therefore, the SDRAM 405 is a memory element for temporarily holding the output data so that the data reading can be done, even during the data transfer without interrupting the reading.

The image data process IC 406 (a gate array) is an element specific for conducting the color correction to remove influences of the above-stated various corrections, the optical system, the image sensor 309 and the like.

The transfer data process IC 407 (a gate array) is an element specific for converting the processed data to a format suitable for transfer, and for controlling the transmission buffer SDRAM 405.

The ROM 408 stores a program for controlling the entire apparatus.

The SRAM 409 is a memory element for temporary storing an operation data for the CPU 401.

The EEPROM 410 is a memory element for storing an adjusting value and the like for the optical sensor.

Figure 1:
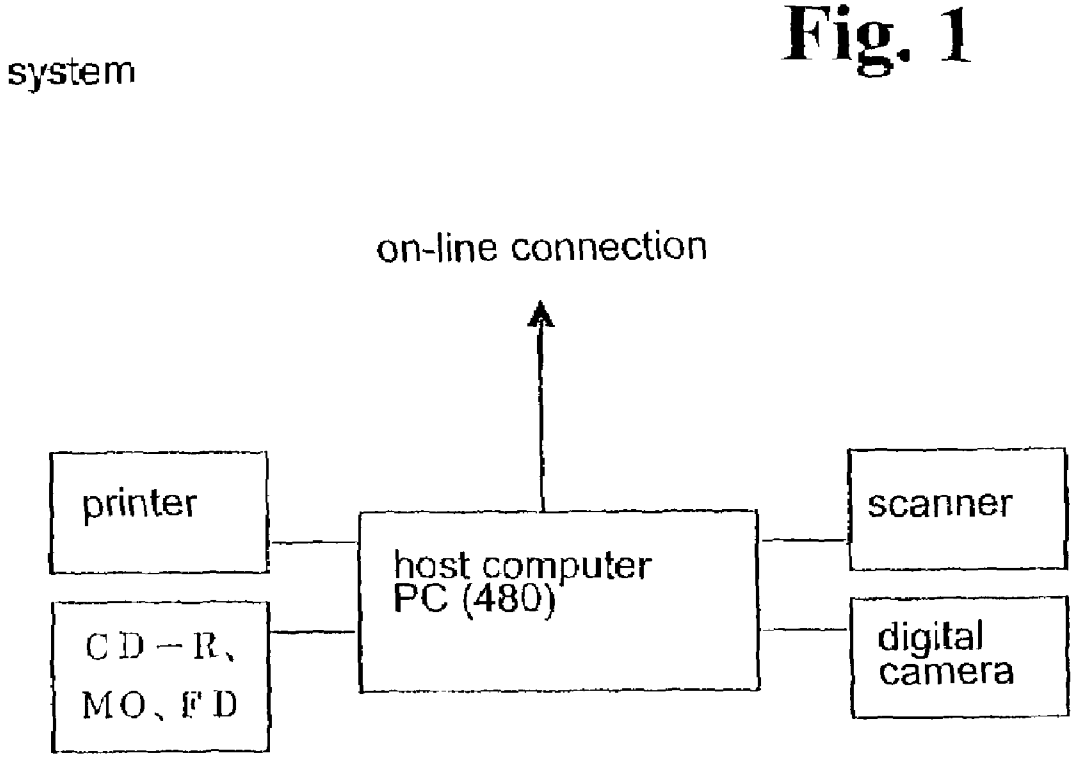
FIG. 1 is a block diagram showing a system to which an image reading apparatus is applied.

The control device 430 is a host computer PC as shown in FIG. 1, and carries out a command for setting a photograph type, starting reading the image and processing the same. Also, with the host computer PC, it is possible to select an automatic photo-supply mode wherein single or a plurality of S-size photographs is automatically transferred to the image reading unit 3 to read, or a panorama mode wherein a panorama photograph is manually transferred to the image reading unit 3 to read. Through the mode selection, the control device 430 can execute one of the reading modes.

In the panorama mode, since a large quantity of the image data is processed, a reading resolution is lower than that of the automatic photo-supply mode. For example, the photograph is read at a resolution of 600 DPI in the automatic photo-supply mode, while the photograph is read at a resolution of 300 DPI in the panorama mode.

Figure 17:
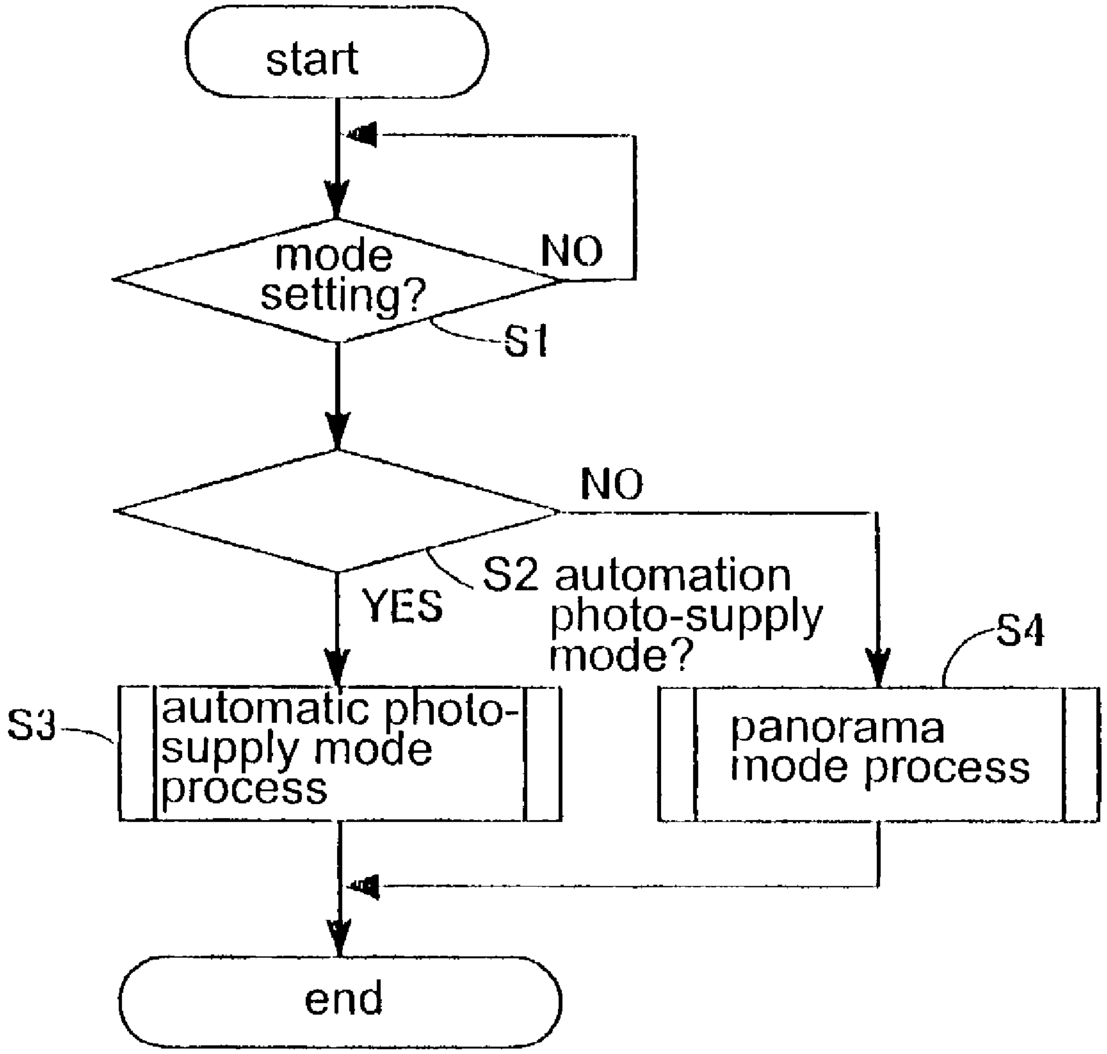
FIG. 17 is a flow chart showing an image reading routine carried out by CPU of a control portion.
Figure 18:
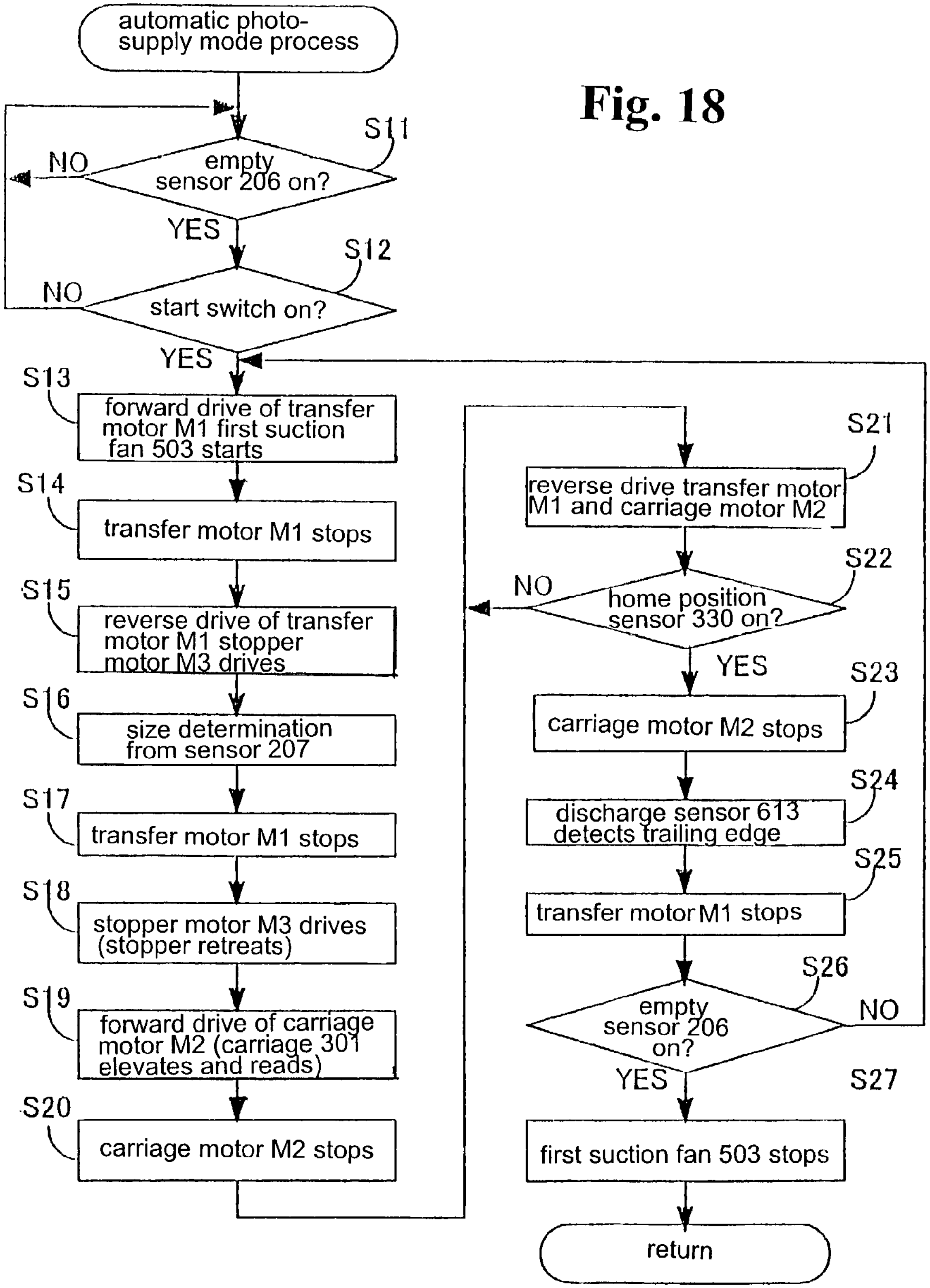
FIG. 18 is a flow chart showing an automatic document supply mode process sub-routine of the image reading routine in FIG. 17.
Figure 19:
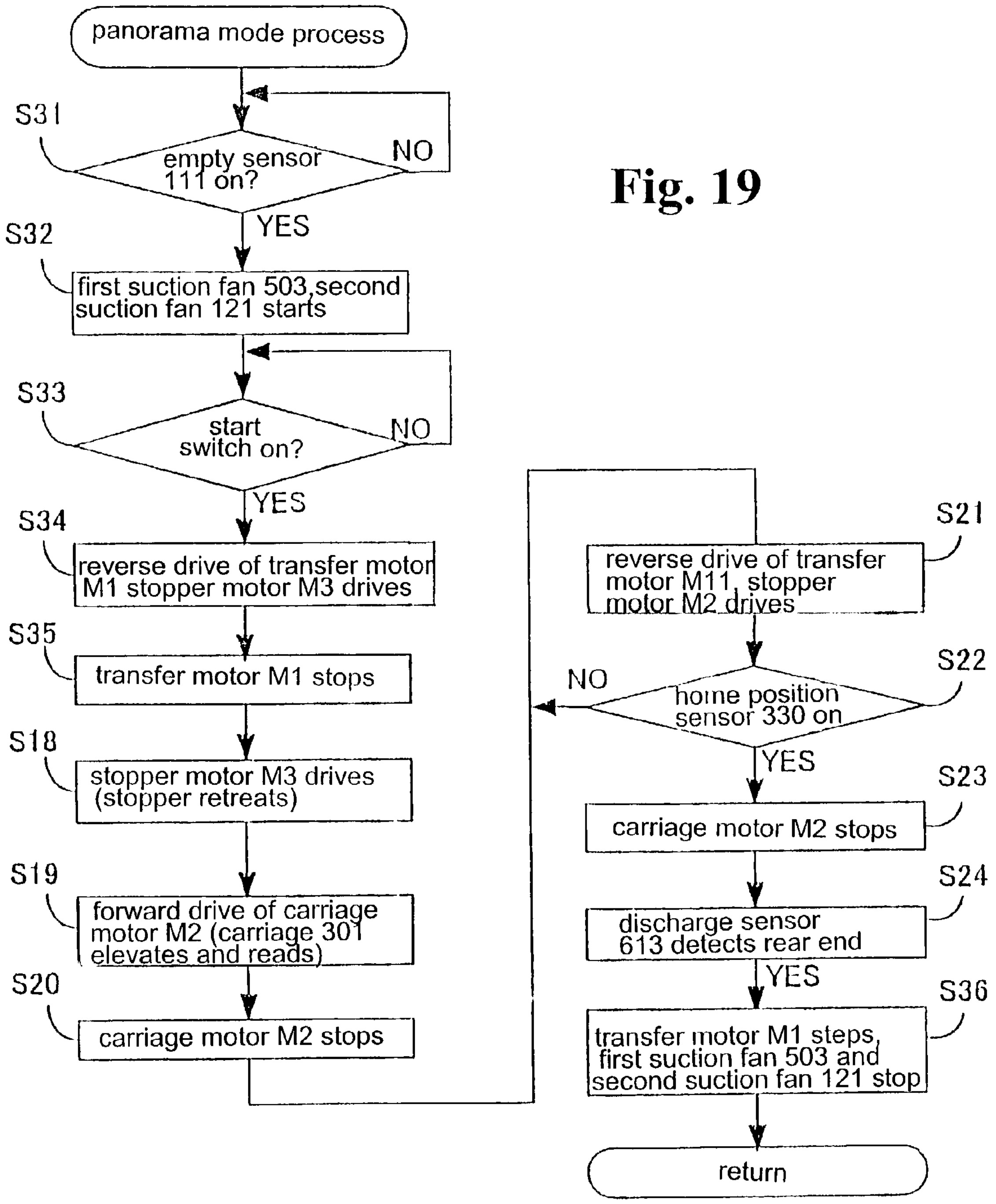
FIG. 19 is a flow chart showing a panorama mode process sub-routine of the image reading routine in FIG. 17.

Next, with reference to flow charts as shown in FIGS. 17, 18 and 19, an operation of the image reading apparatus 1, mainly relating to CPU in the control portion, according to the present embodiment will be explained. When the image reading apparatus 1 is turned on, an image reading routine for reading the image of the photograph is performed.

As shown in FIG. 17, in the image reading routine, the apparatus first stands by until an operator selects a mode through the host computer PC at Step S1. The operator can select either the automatic photo-supply mode or the panorama mode as described above.

At the next Step S2, it is determined whether the automatic photo-supply mode is selected or not. If it is the case, an automatic photo-supply mode process sub-routine is executed at Step S3.

As shown in FIG. 18, in the automatic photo-supply mode process sub-routine, the apparatus stands by until the empty sensor 206 detects an S-size photograph at Step S11. When the output is yes, i.e. when the operator places the S-size photograph on the supply tray 202 with a reading surface of the photograph upward at a center standard and closes the photo-supply tray cover 200, the engagement between a lever 232 and an engaging pin 234 is released. The supply tray 202 is elevated while rotating around the rotating shaft 231, and a surface of the uppermost photograph is pressed against the pick-up roller 250. When the empty sensor 206 detects the S-size photograph, the operator selects a start button on the host computer PC at the Step S12, and it is determined whether a supply signal is sent. If the supply signal is not sent, the routine is returned to Step S11. If the supply signal is sent, the transfer motor M1 rotates forward at Step S13 and, at the same time, the first suction fan 503 starts.

The pick-up roller 250 rotates in the transfer direction (the counter-clockwise direction in FIG. 3), and the uppermost S-size photograph is sent out from the insertion port 20C to the photo-supply path 203. Further, after the S-size photograph is separated into a single photograph by the photo-supply roller 251W and the separation roller 252W rotating in the transfer direction (the counter-clockwise direction in FIG. 3), it is transferred toward the downstream side by the resister rollers 253, 254 along the photo-supply path 203. Also, the first suction fan 503 starts suction in the first suction duct 502.

At Step S14, it is determined whether the timing sensor 207 detects a leading edge of the photograph. In the case of no detection, the transfer motor M1 continues to rotate, and in the case of detection, the transfer motor M1 stops to rotate. At this time, the S-size photograph stays in a state where the leading edge thereof is detected by the timing sensor 207.

Next, at Step S15, the transfer motor M1 rotates in reverse to rotate the transfer belt 505 in the transfer direction (the clockwise direction in FIG. 3), and, at the same time, the stopper motor M3 is driven thus allowing the stop members 508*a*, 508*b* to move and the abutting members 805*a*, 805*b* to advance into the second transfer path 507. The S-size photograph is transferred from the automatic photo-supply port X to the transfer path 700 (the second transfer path 507) through rotation of the resister rollers 253, 254. The photograph is directed toward the transfer belt 505, while the transfer direction is corrected when the leading edge of the photograph abuts against the contact glass 300. The photograph at the transfer belt 505 is transferred to the terminal reference position T by the rotation thereof while being sucked by the first suction fan 503 on the transfer belt 505.

At the Step S16, a size of the S-size photograph is determined from the leading and rear edges of the S-size photograph detected by the timing sensor 207. At Step S17, after the timing sensor 207 detects the leading edge of the S-size photograph, it is determined whether the photograph is transferred by a predetermined distance or not. If the output is no, the transfer is continued, and in the case of yes, the transfer motor M1 stops. Accordingly, the transfer belt 505 stops to rotate, the leading end of the S-size photograph abuts against the abutting members 805*a*, 805*b*, and the photograph is held along the contact glass 300 at the reading position 800 at the terminal reference position T as the standard. At this time, the S-size photograph is sucked on the transfer belt 505 at the substantially central portion thereof in the transfer direction, so that the photograph is held with a predetermined space apart from the contact glass 300, as described above.

Next, at Step S18, the stopper motor M3 rotates in reverse to move the stop members 508*a*, 508*b* and retreat the respective abutting members 805*a*, 805*b* from the second transfer path 507. At Step S19, the carriage motor M2 rotates forward. Thus, the transfer belt 321 rotates in the clockwise direction in FIG. 3, and the carriage 301 is elevated from the home position H. The carriage 301 reads the white reference plate 323 for correcting the shading while moving upward, and then reads the image while moving upward over a distance corresponding to the length of the S-size photograph from the reading-start position S.

At Step S20, it is determined whether the carriage 301 is elevated by a distance corresponding to the length of the S-size photograph determined at Step S16 or not. If the output is no, the process at Step S19 continues, and in the case of yes (completion of reading), the carriage motor M2 stops the forward rotation.

At Step S21, the carriage motor M2 and the transfer motor M1 rotates in reverse. The transfer belt 321 rotates in the counter-clockwise direction in FIG. 3 through the reverse rotation of the carriage motor M2, and the carriage 301 starts lowering toward the home position H. Next, at Step S22, it is determined whether the carriage 301 is detected by the home position sensor 330 or not, and if the output is no, the operation is returned to Step S21 to continue the reverse rotation of the carriage motor M2 and transfer motor M1. In the case of yes, at the next Step S23, the carriage motor M2 stops. The reverse drive of the transfer motor M1 is continued, the transfer belt 505 and the discharge belt 612 rotate in the clockwise and counter-clockwise direction, respectively. The S-size photograph is transferred toward the discharge tray 601. Also, at Step S23, it is determined whether the leading end of the S-size photograph is detected or not by the photo-discharge sensor 613. If the output is no, the reverse drive of the transfer motor M1 is continued, and in the case of yes, the rotation speed of the transfer motor M1 is reduced.

Next, at Step S24, it is determined whether the trailing edge of the S-size photograph is detected or not. If the output is no, the reduced rotation speed of the transfer motor M1 is maintained, and in the case of yes, at the next Step S25, after the reverse rotation is continued by a predetermined feeding distance, the transfer motor M1 stops. Thus, the S-size photograph is placed on the discharge tray 601. Next, at Step S26, the empty sensor 206 determines whether the next S-size photograph is detected or not, and in the case of yes, the operation is returned to Step S13 to process the next S-size photograph, while in the case of no, the first suction fan 503 stops at Step S27, thus completing the automatic photo-supply mode process sub-routine and the image reading routine. Incidentally, after the image data on the photograph is processed for the corrections such as the line space correction and the like, it is sequentially transferred to the host computer PC.

On the other hand, in the case that the output is no at Step S2 shown in FIG. 17, a panorama mode process sub-routine as shown in FIG. 19 is executed at Step S4. In the panorama mode, the operator opens the cover 101 and manually inserts a panorama photograph until a leading edge thereof reaches a space between the transfer belt 505 and the contact glass 300 (for example, the center of the transfer belt 505) through the hand-feed supply port 10C and the transfer path 700 (the first transfer path 109). Thus, a trailing edge of the panorama photograph is placed on the hand-feed supply tray 108*a*. Incidentally, in FIG. 19, the same symbols for the same steps as those in FIG. 18 are assigned and explanations thereof are omitted. Only different steps and portions will be explained.

In the panorama process sub-routine at Step S31, the apparatus first stands by until the empty sensor 111 detects the panorama photograph. Once the empty sensor 111 detects the panorama photograph, at the next Step S32, the first suction fan 503 and the second suction fan 121 start therefore, the first suction duct 532 and the second suction duct 120 start sucking, respectively. The transfer belt 505 pulls the leading edge side of the panorama photograph, and the inlet port 125 formed at the guide frame 108*b* pulls the trailing edge side thereof.

Next, at Step S33, when the operator selects a start button on the PC and a photo-supply signal is confirmed, at the next Step S34, the transfer motor M1 rotates in reverse after a predetermined time and, at the same time, the stopper motor 3 is driven. Thus, the transfer belt 505 rotates in the clockwise direction in FIG. 3 to thereby allow the abutting members 805*a*, 805*b* to advance into the transfer path 507 (the second transfer path 507). Then, the trailing edge side of the panorama photograph is sucked through the second suction fan 121 and separated by the predetermined distance from the contact glass 300 as described above. While the first suction fan 503 is pulling the leading edge side of the panorama photograph, the panorama photograph is transferred toward the downstream side through rotation of the transfer belt 505.

Next, at Step S35, it is determined whether the trailing edge of the panorama photograph is detected or not by the empty sensor 111. In the case that the output is no, the transfer motor M1 continues to rotate, while in the case of yes, the panorama photograph is further transferred by a predetermined distance (a distance required for the leading edge of the panorama photograph to abut against the abutting members 805*a*, 805*b*), and thereafter, the transfer motor M1 stops. At this time, the leading edge of the panorama photograph abuts against the abutting members 805*a*, 805*b* to thereby stop at the reading position 800 with the terminal reference position T as standard. The leading edge of the panorama photograph is sucked to the transfer belt 505 by the first suction fan 503, and the trailing edge thereof is sucked through the inlet port 125 of the guide frame 108*b* by the second suction fan 121. Thus, the transfer belt 505 and the suction port 125 hold the panorama photograph with the predetermined distance away from the contact glass 300 as described above.

At the next Steps S18 to S24, as described above, the same processes as steps corresponding to the automatic photo-supply mode process sub-routine as shown in FIG. 18 are carried out. Among these steps, differences from the steps in the automatic photo-supply mode process sub-routine are that the carriage 301 is moving over a longer distance, and the process time until the panorama photograph ejection becomes longer. This is because the panorama photograph has a longer length than the S-size photograph, At Step S36, after a predetermined time, the transfer motor M1, the first suction fan 503 and the second suction fan 121 stop to complete the panorama mode process sub-routine and the image reading routine.

Incidentally, after the corrections such as the line space correction, the image data read from the photograph is transferred to the control device 430.

Second Embodiment

An image reading apparatus according to the second embodiment is also an apparatus for reading an image on a photograph as in the first embodiment. The image reading apparatus is incorporated into a system installed in a photo processing shop as shown in FIG. 1, and connected to the host computer PC (the control device 430).

Figure 20:
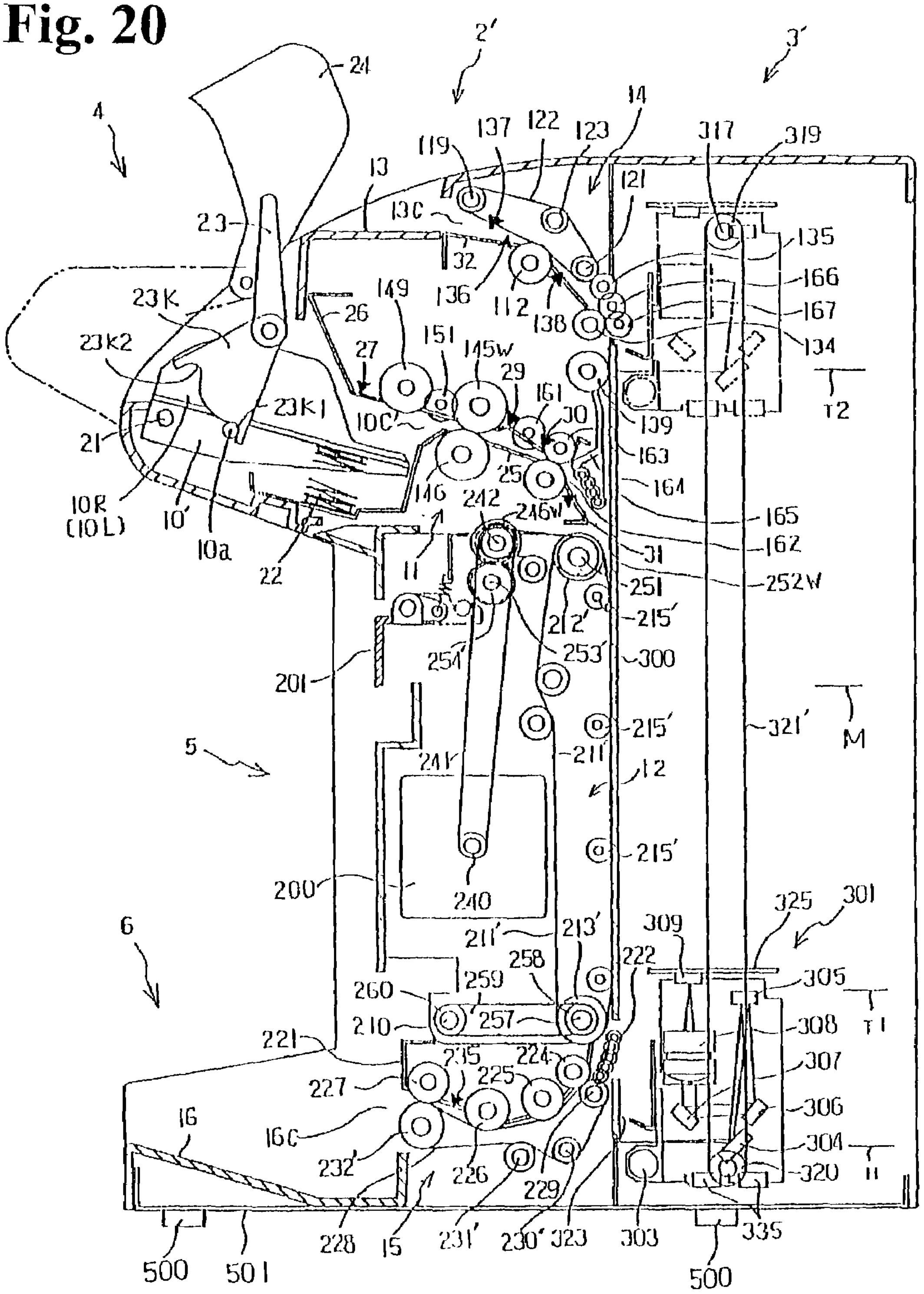
FIG. 20 is a side sectional view showing an image reading apparatus according to another embodiment of the invention.

As shown in FIG. 20, this image reading apparatus, similar to the first embodiment, is formed of a transfer unit 2' for transferring a photograph one by one, and an image reading unit 3' for reading the image on the photograph and having the contact glass 300 held substantially vertically. The image reading apparatus performs the first reading mode for reading the stationary photograph on the contact glass 300, and the second reading mode for reading the photograph transferred by the transfer unit 2'. Also, although the transfer unit 2' includes a supply tray and a hand-feed supply tray similar to the first embodiment, the transfer unit 2' is different in that a photo-supply device is provided for automatically supplying the photograph placed on the hand-feed tray.

Hereunder, only features different from the first embodiment will be explained.

Figure 21:
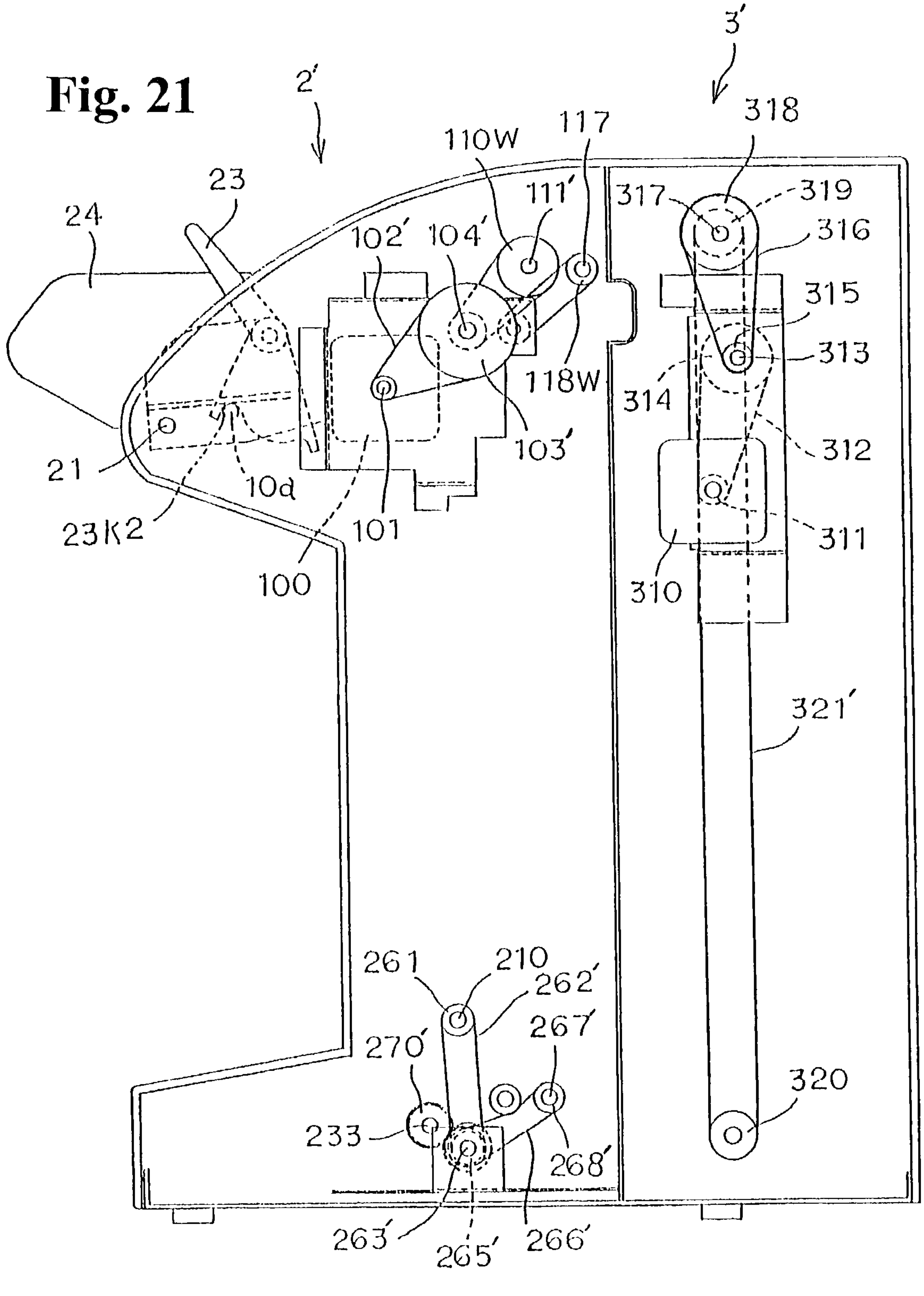
FIG. 21 is a side sectional view showing a driving system of an image reading unit and motors of a transfer unit according to the embodiment of the invention in FIG. 20.
Figure 22:
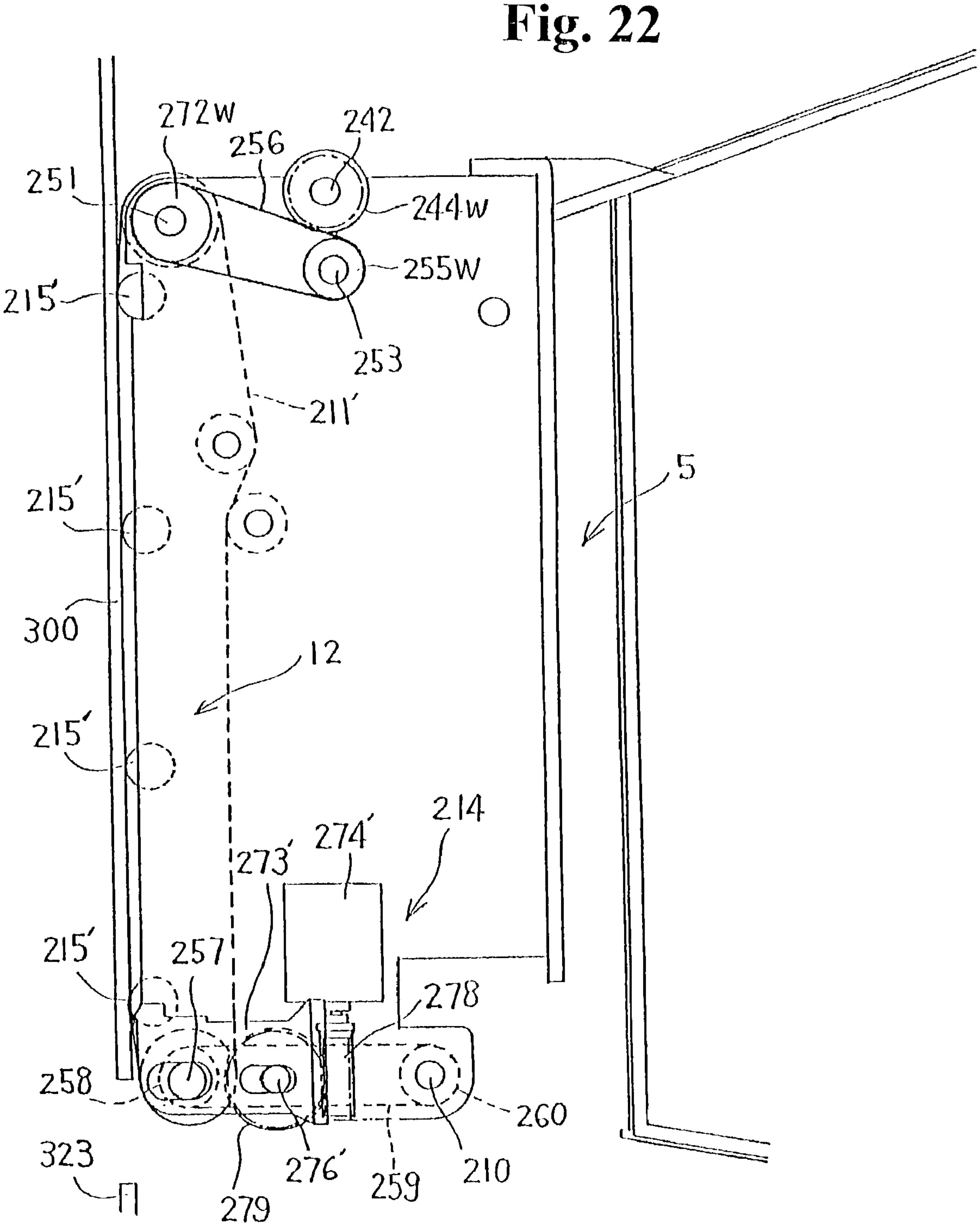
FIG. 22 is a side sectional view showing a stop device of the embodiment of the invention in FIG. 20.

As shown in FIGS. 20, 21 and 22, the transfer unit 2' is formed of a supply portion 4, a transfer portion 5 and a discharge portion 6. A supply motor 100, a transfer/discharge motor 200 and a stopper motor 274 drive them as their driving sources.

The supply portion 4 includes a supply tray 10' on which a plurality of the photographs is placed; a supply device 11 for separating the photographs on the supply tray 10 one by one and supplying it through the supply port 10C; a hand-feed tray 13 on which the photograph is placed; and a hand-feed supply device 14 for supplying the photograph on the hand-feed tray 13 toward a reading position through the hand-feed port 13C.

The supply device 11 is formed of a pick-up roller 149, a guide roller 151, a supply roller 145W, a separation roller 146, a guide roller 161, a resister roller 162 and a press roller 163 disposed along a supply path formed of guides 25 and 26. Also, in the supply path, an empty sensor 27, a resister sensor 30 and a timing sensor 31 are provided.

The hand-feed supply device 14 is formed of a rubber roller 112, a timing belt 122 supported by pulleys 119, 121 and 123, guide rollers 135, 166, 167, a grid roller 134 and a rubber roller 139. They are disposed along the hand-feed supply path. Also, a hand-feed empty sensor 136, a recognition sensor 137 and a timing sensor 138 that is for setting a feeding distance to the reading position by detecting a leading and a trailing edge of the photograph are provided.

Incidentally, there are provided a supply transmission device (formed of a gear, a timing belt and the like) for transmitting the forward rotation of the supply motor 100 to the supply device 11; and a hand-feed transmission device (formed of a gear, a timing belt and the like) for transmitting the reverse rotation of the supply motor 100 to the hand-feed supply device 14. Accordingly, a single motor (the supply motor 100) drives the supply device 11 and the hand-feed supply device 14.

The transfer portion 5 includes a transfer device 12 for transferring the photograph to a predetermined reading position in a direction substantially perpendicular.

The transfer device 12 includes an endless timing belt 211' rotated by the transfer/discharge motor 200 and extended between the timing pulley 212' and the timing pulley 213'. Also, the timing belt 211' is elastically urged toward the contact glass 300 by a plurality of timing pulleys 215'.

A transfer path (a guide path) is formed between the timing belt 211' and the contact glass 300 for transferring the photograph in a vertical direction. Due to the transfer force of the timing belt 211' and a gravity of the photograph, a nipping force of the transfer path can be reduced without reducing a transfer force. Therefore, it is possible to prevent the photograph from being stuck to the contact glass 300 by a static electricity and being scratched on the surface thereof.

Incidentally, as shown in FIG. 22, in order to stop the transferred photograph at the terminal reference position T1 (in the vicinity of the lower end of the transfer belt 211), a stop device 214 driven by a stopper motor 274' is provided so as to advance into and retreat from the guide path through a cam. The stop device 214 includes a stop member 273'. A front end of the stop member 273' is provided with abutting members that advance into the transfer path to abut against the leading edge of the photograph and stop the photograph at the terminal position T1. Since the stop device 214 is driven by the same mechanism as in the first embodiment, the detailed explanation thereof is omitted.

The discharge portion 6 includes a discharge device 15 for discharging the photograph after the image is read at the reading position by an input device 3 through a discharge port 16C, and a discharge tray 16.

The discharge portion 6 includes a carryout guide 221 for forming a discharge path, and a discharge sensor 235 is provided to the discharge path.

The discharge device includes a discharge belt 228 for discharging the photograph to the discharge tray 16 along the carryout guide 221 by contacting the image surface of the photograph; and a discharge roller supported by rollers 229, 230, 231, 232. The carryout guide 221 is provided with rollers 224, 225, 226, 227. Since at lease one of a pair of the rotors for transferring the photograph is formed of an endless belt 228, which contacts the image surface of the photograph, and the carryout guide is formed of the belt 228, it is possible to reduce scratches and stains of the photograph. Also, since the transfer force can be applied to a lager area, a nipping force can be reduced without reducing the transfer force, and scratches to the image surface can be decreased.

Further, the carryout guide includes a series of rollers 222 (rotors) disposed in the transfer direction. The plural rollers 222 are disposed to overlap each other at the outer peripheries of the adjacent rollers 222 in a zigzag pattern.

The transfer/discharge motor 200 drives the transfer device 12 and the discharge device 15. Through a transmitting device formed of a gear, a timing belt and the like, the transfer/discharge motor 200 rotates forward to drive the resister roller 162 and the transfer belt 211', and in reverse to drive the discharge portion 6.

Photographs having a size of, for example, E size (88 mm×117 mm), L size (88 mm×127 mm), 4R size (4 inch×6 inch) or high vision size (88 mm×156 mm) are set on the supply tray 10 with the surface (an image surface) upward. Also, photographs thicker than those set on the supply tray 10 with a size of, for example, instant photograph small (86 mm×54 mm), instant photograph large (86 mm×108 mm) or slender panorama photograph (88 mm×254 mm) are set on the hand-feed tray 13 with the image surface upward. Incidentally, since the instant photographs are thick and difficult to transfer, it is necessary to transfer the instant photograph sandwiched between a base plate and a transparent film as a carrier.

The image reading unit 3, like the first embodiment, includes the carriage 301 for carrying out a reading scan of the photograph and provided with a light source, photoelectric converting device and the like; the white reference plate 323 disposed under the contact glass 300 for correcting the shading; and the home position sensor 330. Incidentally, the carriage 301 is supported to move up and down along the contact glass 300 between the home position H and a reading position T2 where the reading is carried out in a scan reading mode, and is driven by a carriage motor 310 (driven in the same manner as in the first embodiment).

A shock-absorbing member 335 is provided at a lower end surface of the carriage 301, so that even if the carriage 301 passes beyond the home position H and collides with a lower frame 332 by accident, the impact can be absorbed.

The image reading apparatus of the second embodiment includes the control board 400 (refer to FIG. 16) same as in the first embodiment, which controls the respective motors and does processing the image data, such as the line space correction.

The control device 430 is the host computer PC as shown in FIG. 1, and selects a photo-supply mode (either an automatic photo-supply mode or a hand-feed supply mode). Through selection of the photo-supply mode, the photograph can be read according to the first or second reading mode as described above.

Incidentally, the second reading mode is used only for the panorama photograph. However, the picture quality in the second reading mode is not as good as the first where the photograph is stationary while reading, and data of the panorama photograph becomes large. Therefore, a resolution of the second reading mode is set to be lower than that of the first reading mode. In the present embodiment, the reading is carried out at a resolution of 600 DPI in the first reading mode, while the reading in the second reading mode is carried out at a resolution of 300 DPI. Also, the transfer speed of the photograph passing through the reading position T2 in the second reading mode is twice the speed of the carriage 301 in the first reading mode.

Next, operations of the image reading apparatus will be explained.

Figure 23:
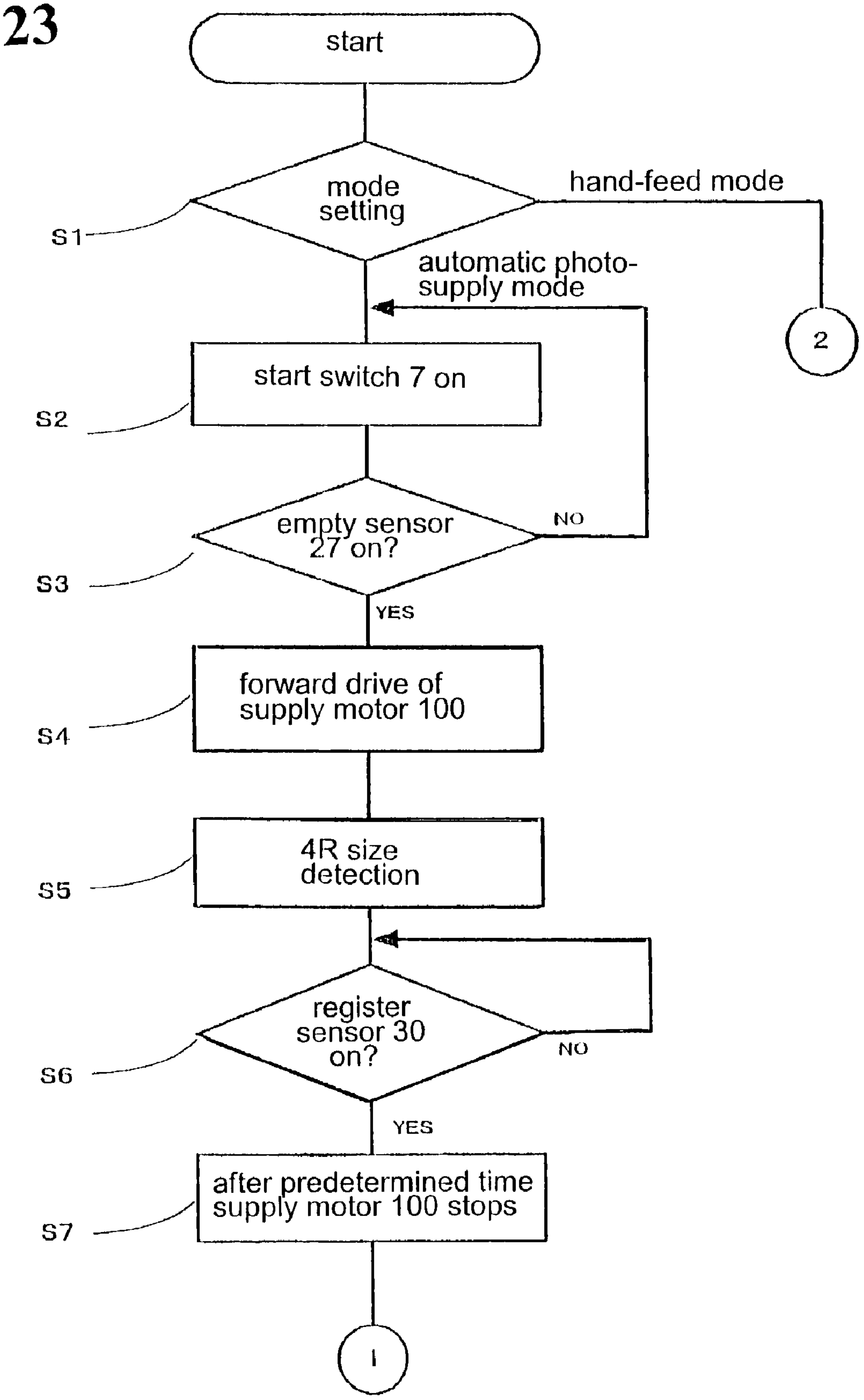
FIG. 23 is a flow chart of an automatic document supply mode.
Figure 24:
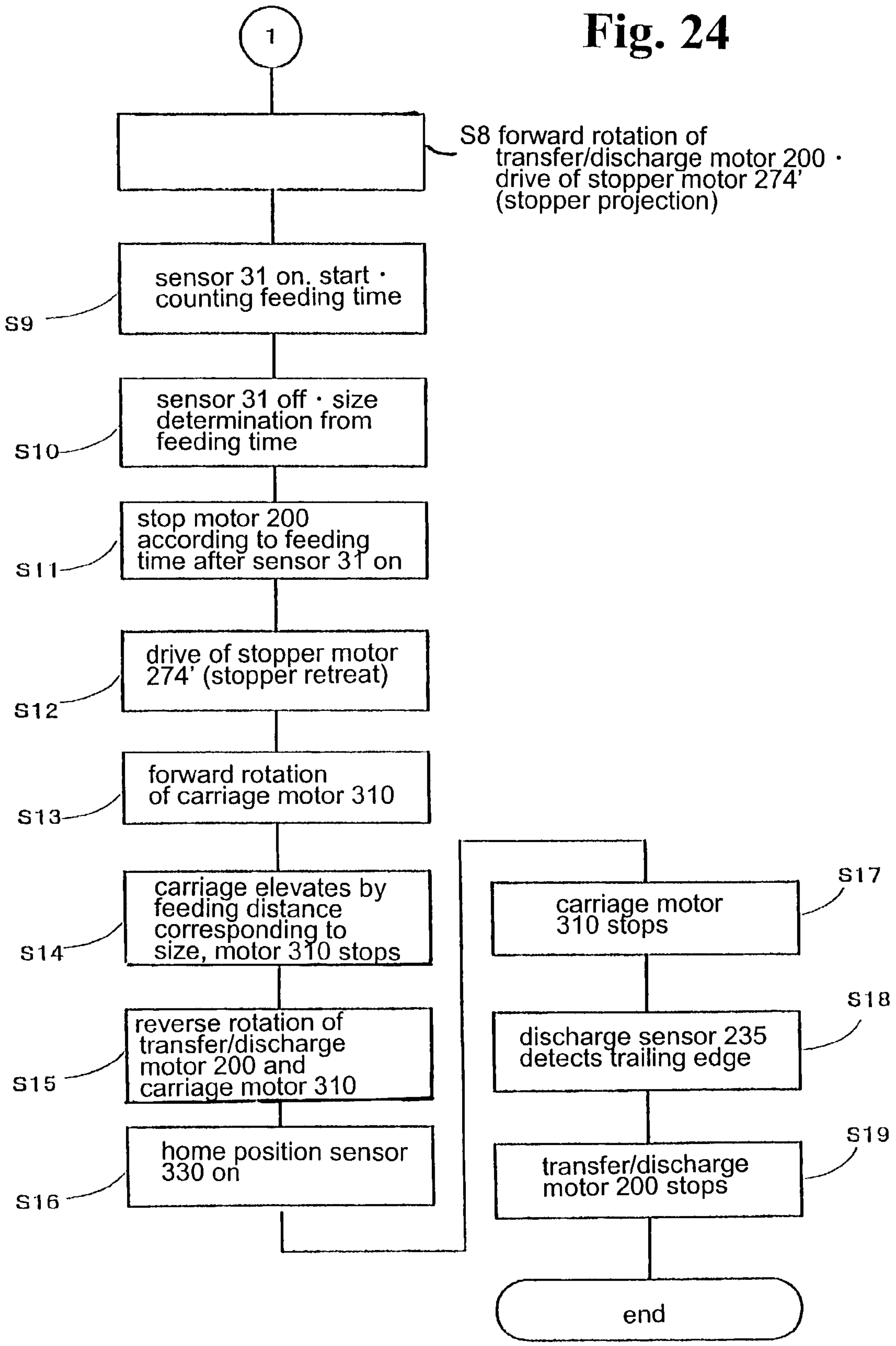
FIG. 24 is a flow chart of an automatic document supply mode.

With reference to FIGS. 23 and 24, the explanation will be made.

First, an operator places a photograph on the supply tray 10, selects the automatic photo-supply mode with the host computer PC (the control device 430) (Step S1) and turns on a start switch (pushes a key on the host computer PC or a switch on the image reading apparatus) (Step S2). When the empty sensor 27 is turned on, the photo-supply motor 100 rotates forward (Steps S3, S4).

The forward drive of the photo-supply motor 100 is transmitted to the supply device 11 through the drive transmission device. The pick-up roller 149 and the supply roller 145W (accompanied by the separation roller 146) rotate in the supply direction to thereby separate the photograph on the photo-supply tray 10, and feed one by one.

When a 4R size photograph is supplied, the sensor 29 detects the photograph (Step S5). When the photograph is not detected, it is recognized that the photograph is another size.

A leading edge of the photograph separated to a single sheet is aligned at a nip point of the resister rollers 162 and 163 to thereby correct skew in the transfer direction. Incidentally, the resister sensor 30 detects the leading edge of the photograph separated to a single sheet before it reaches the resister rollers 162, 163 (Step S6), and the supply motor 100 is terminated after a predetermined time (Step S7).

Thereafter, the transfer/discharge motor 200 rotates forward (Step S8), and through the drive transmission device, the resister roller 162 (resister roller 163) and timing belt 211' are rotated in the transfer direction. In coincidence therewith, the abutting members advance into the transfer path through the drive of the stopper motor 274'.

Through the rotation of the resister rollers 162 and 163, the photograph is transferred toward the transfer belt 211' along the supply path. Incidentally, the sensor 31 detects the leading and trailing edges of the photograph, and the size of the photograph is determined by the time difference (Steps S9, S10).

Further, the transfer belt 211 is rotated to transfer the photograph along the contact glass 300, and the transfer/discharge motor 200 stops after a predetermined time (Step S11). At this time, the photograph is stopped at the terminal reference position T1 in a state where the leading edge of the photograph abuts against the abutting members.

Then, the stopper motor 274 (Step S12) drives the abutting members to retreat from the transfer path. Incidentally, at this time, a pre-supply process of the next photograph (process until the next photograph abuts against the resister rollers 163, 164) is carried out, as described before, through the forward rotation of the photo-supply motor 100 (the second photograph supply).

Next, the carriage motor 310 rotates forward (Step S13) to elevate the carriage 301 from the home position H through the drive transmission device. While moving upward, the carriage 301 reads the white reference plate 323 followed by the image over a distance corresponding to the size of the photograph from the terminal reference position T1. When the reading is completed, the carriage motor 310 stops (Step S14).

Next, the transfer/discharge motor 200 and the carriage motor 310 rotate in reverse (Step S15). The carriage 301 is lowered through the reverse rotation of the carriage motor 310. When the home position sensor 330 detects the carriage 301 (Step S16), the carriage motor 310 stops (Step S17). Through the reverse drive of the transfer/discharge motor 200 (the discharge portion 6), the discharge belt 228 and discharge roller 234 are rotated in the discharge direction through the drive transmission device, and the photograph is discharged on the discharge tray 16, after the image is read. At that time, when the discharge sensor 235 detects that the photograph has been discharged (Step S18), the transfer/discharge motor 200 stops (Step S19).

When the first photograph is discharged, the second photograph is pre-transferred and stops at the terminal reference position T1 as described before. Then, the carriage

301 reads the image thereof, and the process is repeated until the empty sensor 27 detects no more photograph.

Figure 25:
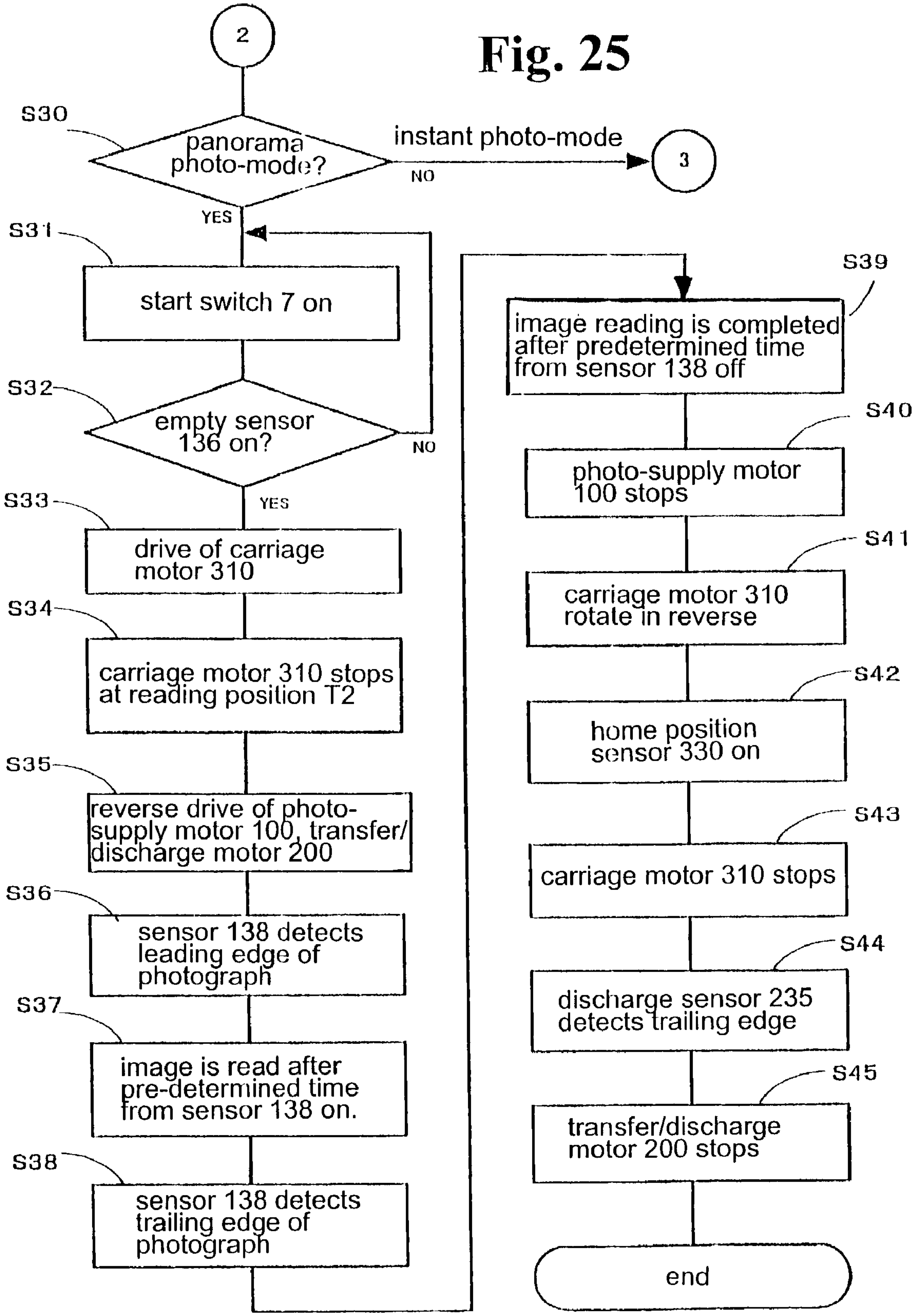
FIG. 25 is a flow chart of a panorama photograph mode.
Figure 26:
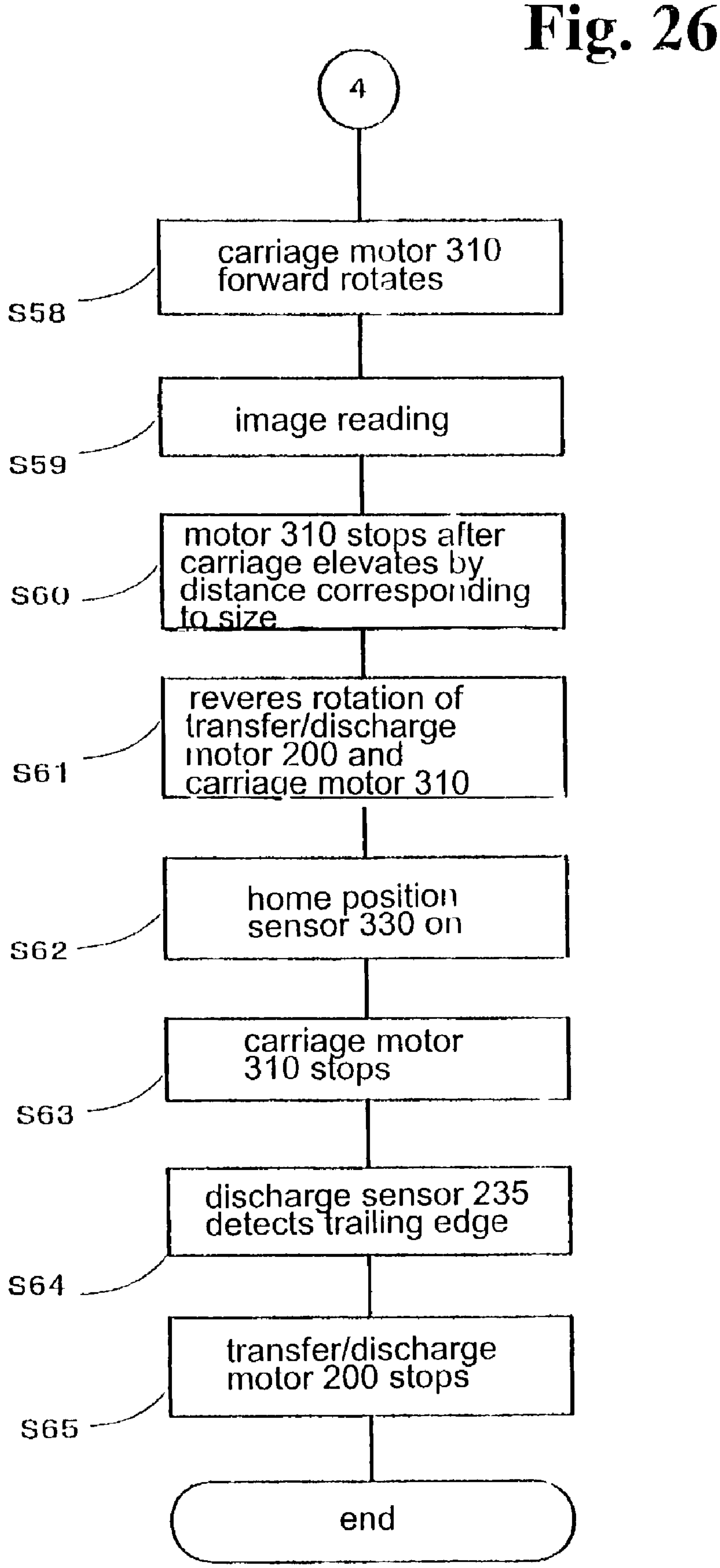
FIG. 26 is a flow chart of an instant photograph mode.
Figure 27:
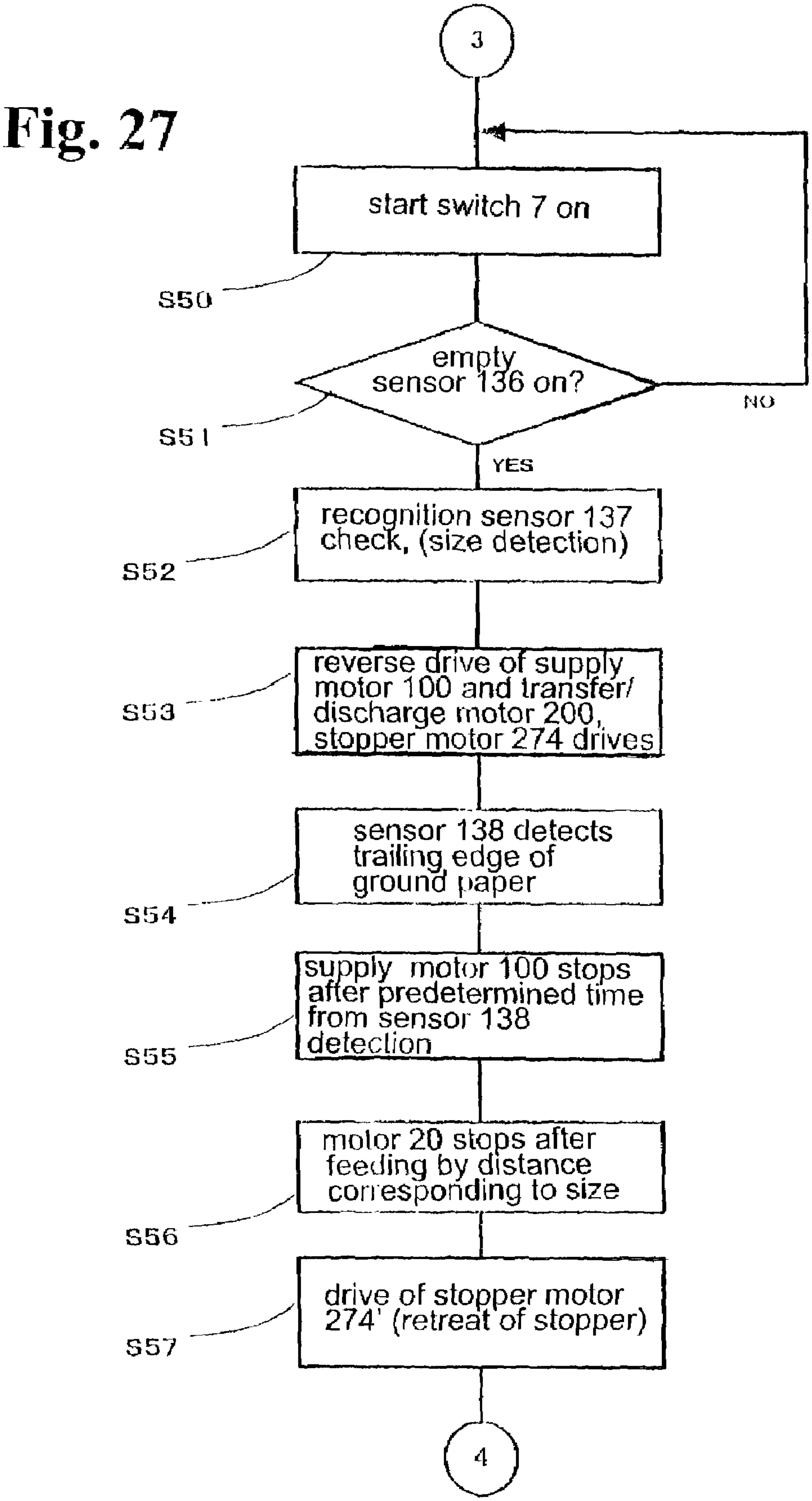
FIG. 27 is a flow chart of the instant photograph mode.

Next, the hand-feed supply mode will be explained with reference to FIG. 23 and FIG. 25. The hand-feed supply mode is used for a panorama photograph and an instant photograph. The panorama photograph is read by the second reading mode and the instant photograph is read by the first reading mode.

First, the case of the panorama photograph will be explained.

The panorama photograph is set on the hand-feed tray 13, and the operator selects the panorama photo-mode with the control device 430 (Step S30). The recognition sensor 137 is located out of a position where the panorama photograph is detected, so that the recognition sensor 137 will not detect the panorama photograph.

When the panorama photo-mode is selected and the start switch is turned on (Step S31), it is checked whether the empty sensor 136 of the hand-feed tray 13 is on (whether the photograph is set on the hand-feed tray 13) (Step S32). When the start switch 7 is turned on and the photograph is set on the hand-feed tray 13, the carriage motor 310 of the input device 3 rotates forward (Step S33), and the carriage 301 is elevated to the terminal reference position T2 (Step S34).

Also, the supply motor 100 and the transfer/discharge motor 200 rotate in reverse (Step S35). The reverse drive of the supply motor 100 is transmitted to the hand-feed supply portion 14 through the drive transmission device to thereby rotate the roller 112, belt 122, grid roller 134 and roller 139 in the supply direction. Also, the transfer belt 211, photo-discharge belt 228, roller 225 and photo-discharge roller 234 are rotated by the reverse drive of the transfer/discharge motor 200.

The sensor 138 detects the leading edge of the panorama photograph transferred through the roller 112, belt 122, grid roller 134 and roller 139 (Step S36). After a predetermined time therefrom, the carriage 301 staying at the terminal reference position T2 starts to read the panorama photograph (Step S37). The image of the panorama photograph is read while further being transferred downward by the roller 112, belt 122, grid roller 134, roller 139 and transfer belt 211. When the sensor 138 detects the trailing edge of the photograph (Step S38), after a predetermined time therefrom, the image reading is completed (Step S39), and the supply motor 100 stops (Step S40).

Also, through the reverse drive of the carriage motor 310 (Step S41), the carriage 301 is moving downward and stops when detected by the home position sensor 330 (Steps S42, S43).

When the discharge sensor 235 detects the trailing edge of the photograph (Step S44), the motor 200 stops (Step S45).

Next, the case of an instant photograph will be explained.

First, the instant photograph mounted on a base paper is placed on the hand-feed tray 13. Then, the instant photo-mode is selected with the control device 430 (Step S36). The instant photographs include a large size and a small size, and both of them are sandwiched by the base papers and transferred, respectively. When the recognition sensor 137 detects the base paper, the instant photograph is determined to be the large size. If the recognition sensor 137 does not detect the base paper, the instant photograph is determined to be the small size.

When a start switch 7 is turned on (Step S50), it is checked whether the empty sensor 136 is turned on or not (Step S51), and in the case the empty sensor 136 is turned on, the recognition sensor 137 determines whether the set instant photograph is the large size or the small size (Step S52). Also, the supply motor 100 rotates in reverse, the hand-feed supply device 14 is driven, the transfer/discharge motor 200 rotates in reverse, and the transfer belt 211' and the photo-discharge portion 6 are driven (Step S53). Also, the stopper motor 274 is driven and the abutting members advance.

The sensor 138 detects the trailing edge of the base paper (Step S54), and the supply motor 100 stops after the trailing edge passes through the roller 139 (Step S55). Further, the transfer belt 211 is rotated to transfer the base paper, and after a predetermined time therefrom, the transfer/discharge motor 200 stops (Step S56). At this time, the base paper is stopped in a state where the leading edge thereof abuts against the abutting member at the terminal reference position T1. Further, the stopper motor 274 drives to retreat the abutting member (Step S57).

Next, the carriage 301 moves to read, and then the photograph is discharged. Since the process is the same (Step S13–Step S19) as that of the first reading mode of the automatic photo-supply mode, the explanation thereof is omitted.

In the image reading apparatus of the second embodiment, since the contact glass 300 is disposed substantially vertically and the carriage 301 is elevated along the contact glass 300 to read the image on the photograph, it is possible to reduce the installation space of the image reading apparatus. In the conventional image reading apparatus, since the contact glass 300 is disposed horizontally with respect to the installation surface of the apparatus for the carriage 301 to traverse, it is necessary to have a distance L1 from the home position H to the reference position T including a distance for stabilizing the speed of the carriage 301 to read in a stable manner from the reference position T and a distance for reading the white reference plate 323; and a distance L2 corresponding to the width of the carriage 301 in order to move the carriage 301 to the end of the contact glass 300. Therefore, the casing becomes larger by the distances L1 and L2 in addition to the length of the contact glass 300, resulting in increase in the installation space. In the present image reading apparatus, since the contact glass 300 is disposed substantially vertically and the carriage 301 is moved in the vertical direction, the installation area thereof can be reduced by the distances L1, L2.

Also, since the photograph is stationary along the contact glass 300 and the carriage 301 is moved to read the image, any influence on the image quality due to vibrations generated by transfer of the photograph can be eliminated to thereby obtain an excellent image.

The carriage 301 is supported through the engagement between the supporting members 350, 351 and the guide shaft 333 through the sliding members 352, 353. Since there are dimensional deviations between the guide shaft 333 and the sliding members 352, 353, when the carriage 301 is moved, wobbling (vibration) is generated. The wobbling during lowering of the carriage 301 becomes larger than that during elevating. Therefore, in the present embodiment, the reading scan of the photograph is carried out while the carriage 301 is moving upward to thereby reduce influence of the vibration on the image quality. The reading scan can be carried out while being lowered as well.

Also, since the terminal reference position T as a stop standard of the photograph transferred by the transfer unit 2 is set in a vicinity of the lower end of the contact glass 300, the contact glass 300 can be shortened, resulting in a minimized apparatus size.

Furthermore, the terminal reference position T as the stop standard is disposed at the lower position of the contact glass 300, and, at the same time, the stopping device 508 (stopping members 508*a*, 508*b*) is provided so that the abutting members 805*a*, 805*b* of the stopping device 508 can advance into or retreat from the transfer path 700 (the second transfer path 507). Therefore, even if the photograph falls down during transfer, the photograph can be surely stopped at the terminal reference position T so that the image can be read. Also, the respective abutting members 805*a*, 805*b* are disposed to advance from the outside of the transfer belt 505 so that they abut against the outer sides of the photograph to correct the skew of the photograph.

Also, when the image reading apparatus is in a idle state, such that the power source thereof is off or it stands by even if the power source is on, since the home position H where the carriage 301 with a large weight stays is located at a position lower than substantially the central position M in the height direction of the contact glass 300 (substantially the central position of the image reading apparatus), the image reading apparatus can be stable. Especially, in the present embodiment, since the lowest position in the operation area of the carriage 301 in the vicinity of the lowest surface of the image reading apparatus is set as the home position H, better stability of the apparatus can be obtained. Further, since the read starting position S is set at a position in the vicinity of the same lower end portion of the contact glass 300 as the terminal reference position T, the distance from the home position H to the terminal reference position T can be shortened, so that a time required before the reading starts can be shortened, resulting in a shorter process time of the entire apparatus. Furthermore, the carriage 301 is disposed on the side of the transfer belt 320 (the endless belt), which is extended between the rotating shaft 317 disposed at the side surface upper position of the frame 350 and the rotating shaft 321 (the second rotation shaft disposed at the side surface lower portion of the frame 350, toward the contact glass 300. The carriage motor M2 drives the upper rotating shaft 317 to rotate the transfer belt 321 for the carriage 301 to move vertically. Therefore, when the carriage 301 moves vertically to conduct the reading scan, tension is applied to the belt on the side of the contact glass 300 where the carriage 301 is disposed to thereby reduce the vibration caused by movement of the carriage 301. Thus, influences of the vibration can be decreased.

Furthermore, the transfer belt 505, which transfers the photograph to the reading position 800 (the terminal reference position T) forms the second transfer path 507 together with the contact glass 300, and is housed in the unit casing 571 to thereby constitute the transfer unit 573. When the transfer unit 573 rotates around the rotating shaft 509 as a pivot disposed under the transfer unit 573 (under the transfer belt 505) and the transfer belt 505 is moved, the second transfer path 507 can be opened. Therefore, a paper jam or the like can be easily removed. Also, when the second transfer path 507 is opened, the transfer unit 573 is placed on the discharge tray 601 at the lower side (lower position) of the image reading apparatus. Therefore, while keeping stability of the apparatus, without using other parts, such as a stopper, the transfer path 507 can be held open.

Both the discharge tray 601 and the supply tray 202 are disposed on one side of the image reading apparatus, (the side opposite to the image reading unit 3), and positioned perpendicular to the contact glass 300. Therefore, the photograph can be set and taken out from the same side. Thus, even if the image reading apparatus is installed at an elevated place, such as a shelf, the photograph can be easily set and taken out to thereby improve operability of the apparatus.

Further, since the S size photograph to be inserted through the insertion port 20C is inserted into the second transfer path 507 from the automatic supply port X disposed between the transfer belt 505 and the second suction device, and is transferred to the terminal reference position T by the transfer belt 505 without passing through the first transfer path 109, its transfer distance becomes shorter to thereby shorten the transfer time. Further, since there is provided the automatic supply portion 20 for transferring the S size photograph to the second transfer path 507 through the automatic supply port X from the insertion port 20C, when the large number of S size photographs need to be transferred and read, the process efficiency can be improved, and the transfer time can be further shortened. Moreover, since the supply tray 202 of the S size photograph, which is used more often, is not required to be disposed at a higher position corresponding to the hand-feed supply tray 108*a* for the panorama photograph, which is used much less often, the operability can be improved.

Incidentally, in the image reading apparatus of the present embodiment, while the scanning device is constituted as an integrated unit (the carriage 301) with the light source and the photoelectric conversion device (CCD), the scanning may be carried out by a fixed photoelectric conversion device while the light source unit and the mirror unit are moving at a speed ratio of 2:1. Incidentally, in this case, it is preferable to read the photograph while elevating or lowering. Further, it is also preferable that the home position of the respective units is disposed on a lower side than the central position of the contact glass.

Also, while the image reading apparatus of the embodiment has been described as the photo-image reading apparatus, the present invention can be applied to an image reading apparatus wherein images on usual paper or post card are read.

Also, in the present embodiment, although the abutting members 805*a*, 805*b* retreat from the transfer path 700 while reading, they may retreat after reading so that the image is read while the abutting members stay in the advanced position.

Further, in the present embodiment, although the panorama photograph is supplied by the hand-feed supply, as in the case of the S size photograph, the process efficiency of the panorama photograph can also be improved by providing a photo-supply device wherein each photograph is automatically separated and supplied. Also, in the present embodiment, although the reference position as the standard for stopping the photograph is set at the same position as the read starting position, the present invention is not limited thereto and the both positions may be different.

As has been described hereinabove, according to the present invention, since the contact glass is substantially vertically disposed and the reading device is elevated or lowered to read the image, the installation space of the image reading apparatus can be reduced and, at the same time, excellent image can be obtained.

While the invention has been explained with reference to the specific embodiments of the invention, the explanation is illustrative and the invention is limited only by the appended claims.

What is claimed is:

1. An image reading apparatus for reading an image on a document, comprising:

a platen having a reading position;

a frame attached to the platen for supporting the same substantially vertically;

a scanning device situated adjacent to the platen for reading the image on the document held at the reading position, said scanning device moving vertically along the platen;

a supply tray disposed adjacent to the platen for storing the document;

a transfer device disposed adjacent to said supply tray for transferring the document from the supply tray to the reading position on the platen; and a discharge tray disposed adjacent to the transfer device for receiving the document transferred from the reading position, one of the supply tray and the discharge tray being positioned at an upper portion of said transfer device and the other of the supply tray and the discharge tray being positioned at a lower portion thereof.

2. An image reading apparatus according to claim 1, wherein said scanning device is an integrated scanning unit including a light source for irradiating light to the document; reflecting means for reflecting the light from the document; collecting means for collecting the light from said reflecting device; and converting means for converting the light collected by the collecting means to an electrical signal.

3. An image reading apparatus according to claim 1, wherein said scanning device has a stand-by position at a portion lower than a center of the platen and staying at the stand-by position when the scanning device is not operating.

4. An image reading apparatus according to claim 1, wherein said scanning device reads the image while moving upward.

5. An image reading apparatus according to claim 1, further comprising a first rotating shaft and a second rotating shaft disposed at an upper and a lower portion of the frame with a space therebetween, and an endless belt arranged between said first rotating shaft and second rotating shaft and holding said scanning device, said endless belt being rotated by rotation of one of the first and second rotating shafts so that the scanning device moves vertically.

6. An image reading apparatus according to claim 1, further comprising a terminal reference position provided in a vicinity of a lower end of the platen for defining a position for stopping the document at the reading position.

7. An image reading apparatus according to claim 6, wherein said transfer device is disposed adjacent to the platen to constitute a transfer path between the transfer device and the platen, said transfer device being moved to open said transfer path when it is necessary.

8. An image reading apparatus according to claim 7, further comprising a rotating shaft provided at a lower portion of said transfer device and extended perpendicular to a document transfer direction, said transfer device being rotated around said rotating shaft to thereby open said transfer path when it is necessary.

9. An image reading apparatus according to claim 7, further comprising a stop device disposed adjacent the platen for stopping the document at said terminal reference position, said stop device being able to advance into and retreat from said transfer path.

10. An image reading apparatus according to claim 1, wherein said scanning device has a position where the scanning device starts to read the image on the document at a vicinity of a lower end of the platen.

11. An image reading apparatus according to claim 1, wherein said supply tray and discharge tray are disposed substantially perpendicular to the platen.

12. An image reading apparatus according to claim 11, further comprising a supply device disposed adjacent to the supply tray for transferring the document from the supply tray to the transfer device and having a curved supply transfer path, and a discharge device disposed adjacent to the discharge tray for transferring the document to the discharge tray from the transfer device and having a curved discharge transfer path.

13. An image reading apparatus according to claim 11, wherein said supply tray is disposed at the upper portion of the transfer device and said discharge tray is disposed at the lower portion of the transfer device.

14. An image reading apparatus according to claim 11, further comprising a second supply tray disposed above the supply tray for supplying the document.

15. An image reading apparatus for reading an image on a document, comprising:

a platen having a first reading position and a second reading position situated above the first reading position;

a frame attached to the platen for supporting the same substantially vertically;

an insertion port attached to the frame for inserting the document located above the second reading position;

an exposure device disposed adjacent to the platen for irradiating light on the document and being arranged to move along the platen vertically;

reading means disposed adjacent to the platen for receiving the light reflected from the document to read the image on the document; and a transfer device attached to the frame for moving the document along the platen, said transfer device being actuated such that the transfer device is stopped after transferring the document to the first reading position along the platen and the exposure device is moved to thereby read the document, and said exposure device is stopped at the second reading position and said transfer device with the document is moved to thereby read the document.

16. An image reading apparatus according to claim 15, wherein said platen is formed of a sheet of contact glass.

17. An image reading apparatus according to claim 15, further comprising a selection device as to whether the document inserted through the insertion port is read at the first reading position or the second reading position.

18. An image reading apparatus according to claim 17, further comprising an electrical device electrically connected to the selection device for sending an electrical signal for selecting whether the document inserted through the insertion port is read at the first reading position or the second reading position.

* * * * *